(12) United States Patent
Komori

(10) Patent No.: US 10,845,515 B2
(45) Date of Patent: Nov. 24, 2020

(54) CONTACTED MULTILAYER DIFFRACTIVE OPTICAL ELEMENT

(71) Applicant: Tamron Co., Ltd., Saitama-shi (JP)

(72) Inventor: Kazunori Komori, Saitama (JP)

(73) Assignee: Tamron Co., Ltd., Saitama (JP)

(*) Notice: Subject to any disclaimer, the term of this patent is extended or adjusted under 35 U.S.C. 154(b) by 0 days.

(21) Appl. No.: 15/579,726

(22) PCT Filed: Oct. 24, 2016

(86) PCT No.: PCT/JP2016/081443
§ 371 (c)(1),
(2) Date: Dec. 5, 2017

(87) PCT Pub. No.: WO2017/082031
PCT Pub. Date: May 18, 2017

(65) Prior Publication Data
US 2018/0180780 A1   Jun. 28, 2018

(30) Foreign Application Priority Data

Nov. 9, 2015   (JP) .................................. 2015-219103
Oct. 17, 2016  (JP) .................................. 2016-203547

(51) Int. Cl.
*G02B 5/18*     (2006.01)
*G02B 13/14*    (2006.01)
(Continued)

(52) U.S. Cl.
CPC ............ *G02B 5/1814* (2013.01); *C03C 3/321* (2013.01); *G02B 5/1866* (2013.01); *G02B 13/14* (2013.01);
(Continued)

(58) Field of Classification Search
CPC .... G02B 5/1866; G02B 5/1814; G02B 13/14; G02B 27/0037; G02B 27/4205;
(Continued)

(56) References Cited

U.S. PATENT DOCUMENTS 5,847,877 A * 12/1998 Imamura .............. G02B 5/1876
                                                             359/566
7,553,544 B2  6/2009 Nakamura et al.
(Continued)

FOREIGN PATENT DOCUMENTS

JP   200133611 A    2/2001
JP   3717555 B2    11/2005
(Continued)

OTHER PUBLICATIONS

Gleason "Designing Optical Properties in Infrared Glass" Thesis (Year: 2015).*
(Continued)

*Primary Examiner* — George G King
(74) *Attorney, Agent, or Firm* — The Webb Law Firm

(57) ABSTRACT

A contacted multilayer diffractive optical element having reduced wavelength dependency of diffraction efficiency, the contacted multilayer diffractive optical element facilitating processing in manufacture and being suitable for an infrared optical system, and an infrared optical system and an image pickup apparatus using the diffractive optical element. In order to achieve the above object, a contacted multilayer diffractive optical element comprises a first layer consisting of a first chalcogenide glass material and a second layer consisting of a second chalcogenide glass material, the first chalcogenide glass material and the second chalcogenide glass material satisfying a predetermined conditional expression and being in contact with and stacked on each other, and a diffraction grating structure in a surface of the (Continued)

contact therebetween, and an infrared optical system and an image pickup apparatus comprising the contacted multilayer diffractive optical element are provided.

17 Claims, 8 Drawing Sheets

(51) Int. Cl.
G02B 27/00 (2006.01)
C03C 3/32 (2006.01)
G02B 27/42 (2006.01)
H04N 5/33 (2006.01)
C03C 19/00 (2006.01)
C03C 27/06 (2006.01)

(52) U.S. Cl.
CPC ..... *G02B 27/0037* (2013.01); *G02B 27/4205* (2013.01); *C03C 19/00* (2013.01); *C03C 27/06* (2013.01); *H04N 5/33* (2013.01)

(58) Field of Classification Search
CPC ......... C03C 3/321; C03C 19/00; C03C 27/06; H04N 5/33
See application file for complete search history.

(56) References Cited

U.S. PATENT DOCUMENTS

| 7,923,116 | B2 | 4/2011 | Nakamura et al. |
| 8,603,928 | B2 | 12/2013 | Tani et al. |
| 2005/0014088 | A1 | 1/2005 | Nakamura et al. |
| 2005/0265151 | A1 | 12/2005 | Kimura et al. |
| 2008/0239493 | A1 | 10/2008 | Ushigome |
| 2009/0231712 | A1 | 9/2009 | Ushigome |
| 2010/0060986 | A1 | 3/2010 | Nakamura et al. |
| 2010/0252942 | A1 | 10/2010 | Ushigome |
| 2010/0285946 | A1 | 11/2010 | Tani et al. |
| 2012/0120494 | A1 | 5/2012 | Takayama |
| 2013/0342909 | A1* | 12/2013 | Sukegawa ................ G02B 1/02 359/571 |
| 2015/0301317 | A1* | 10/2015 | Watanabe ............... G02B 13/14 359/356 |
| 2018/0045975 | A1* | 2/2018 | Mizutani .................. G02B 1/04 |

FOREIGN PATENT DOCUMENTS

| JP | 200612394 | A | 1/2006 |
| JP | 2006220705 | A | 8/2006 |
| JP | 2008242186 | A | 10/2008 |
| JP | 2009217139 | A | 9/2009 |
| JP | 5136358 | B2 | 2/2013 |
| JP | 5339720 | B2 | 11/2013 |
| JP | 2014149430 | A | 8/2014 |
| JP | 2018025650 | * | 2/2018 ............... G02B 1/04 |

OTHER PUBLICATIONS

Wikipedia page "Zinc Sulfide" (Year: 2015).*
Wikipedia page "Zinc Selenide" (Year: 2015).*
Wikipedia page "Chalcogenide Glass" (Year: 2014).*
Saleh et al. Fundamentals of Photonics, p. 882 (Year: 1991).*
Harris et al. "Infrared thermooptic coefficient measurement of polycrystalline ZnSe, ZnS, CdTe, CaF2, and BaF2, single crystal KCl, and Tl-20 glass" Applied Optics, vol. 16, No. 2, pp. 436-428 (Year: 1977).*
Office Action in related Japanese Patent Application No. 2016-203547 dated Feb. 6, 2020.

* cited by examiner

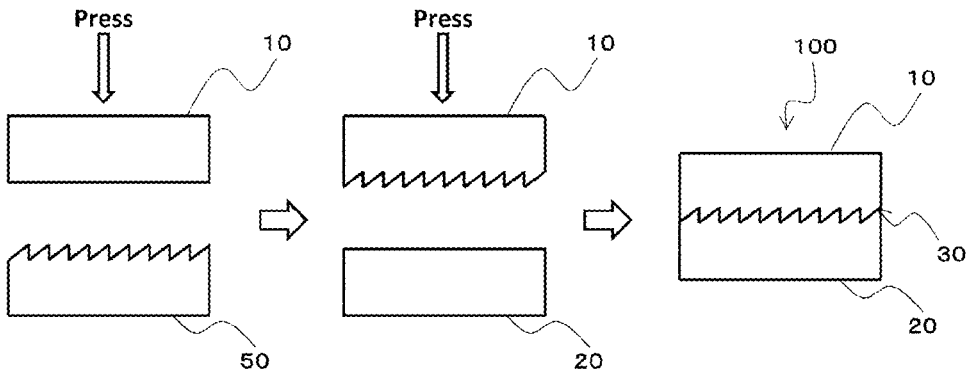
Figure 2 (a1)   Figure 2 (a2)   Figure 2 (a3)
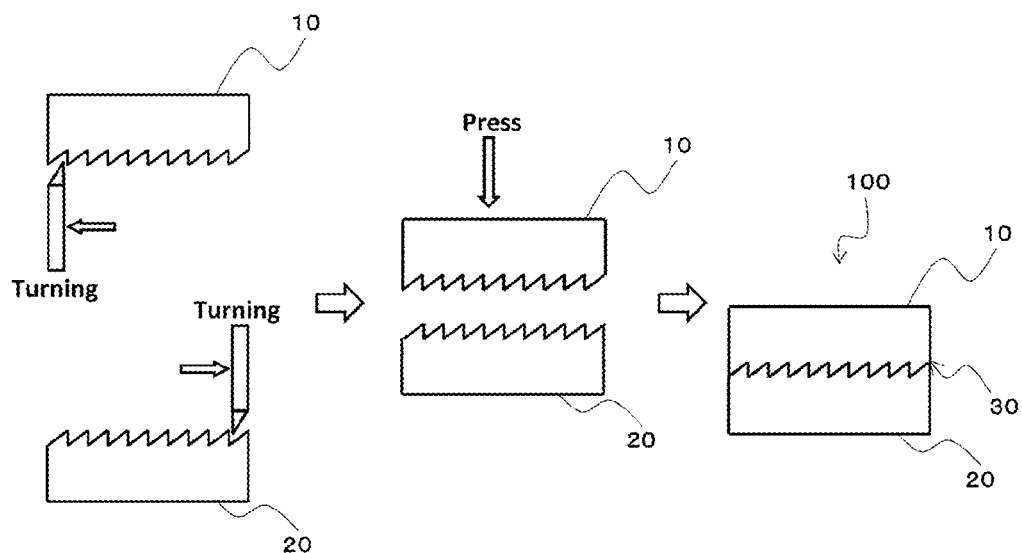
Figure 2 (b1)   Figure 2 (b2)   Figure 2 (b3)

[Figure 3]
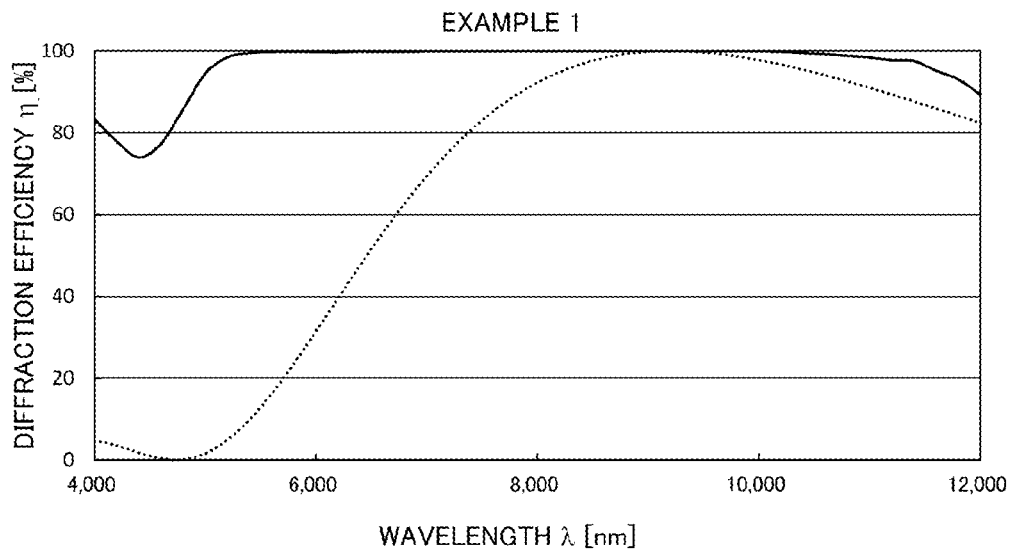
[Figure 4]
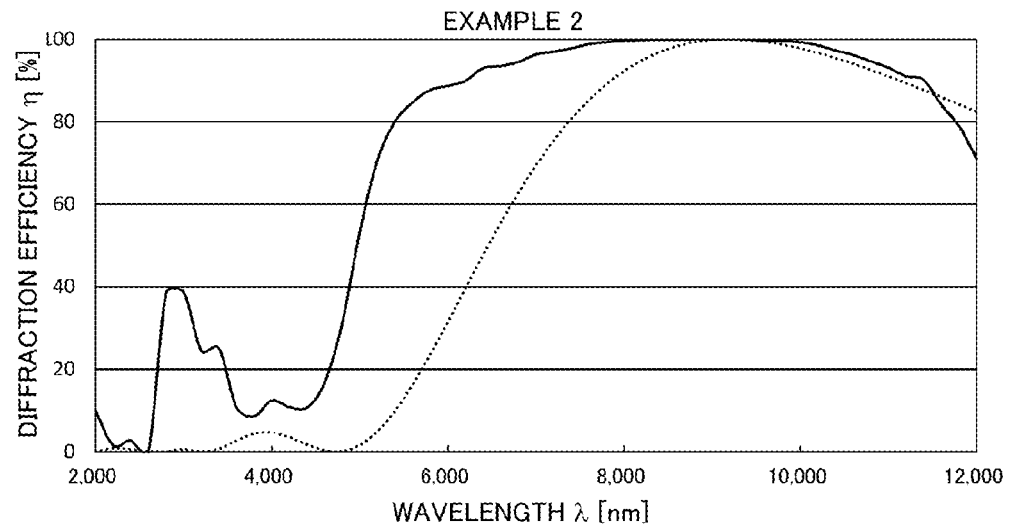

[Figure 5]
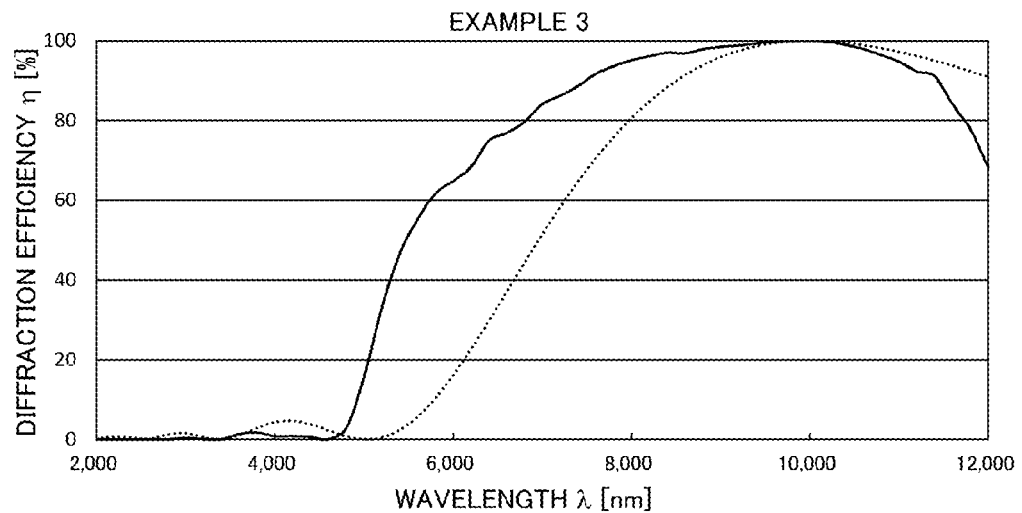
[Figure 6]
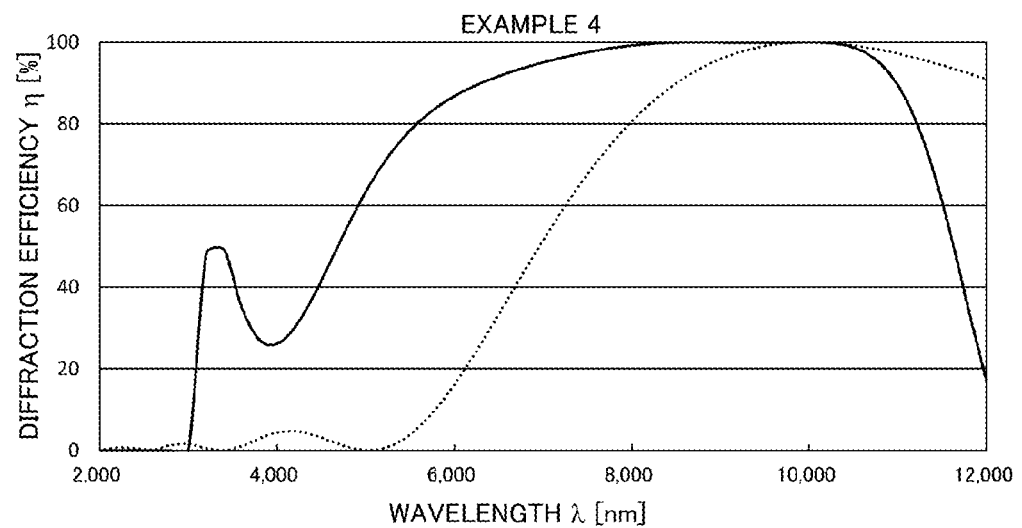

[Figure 7]
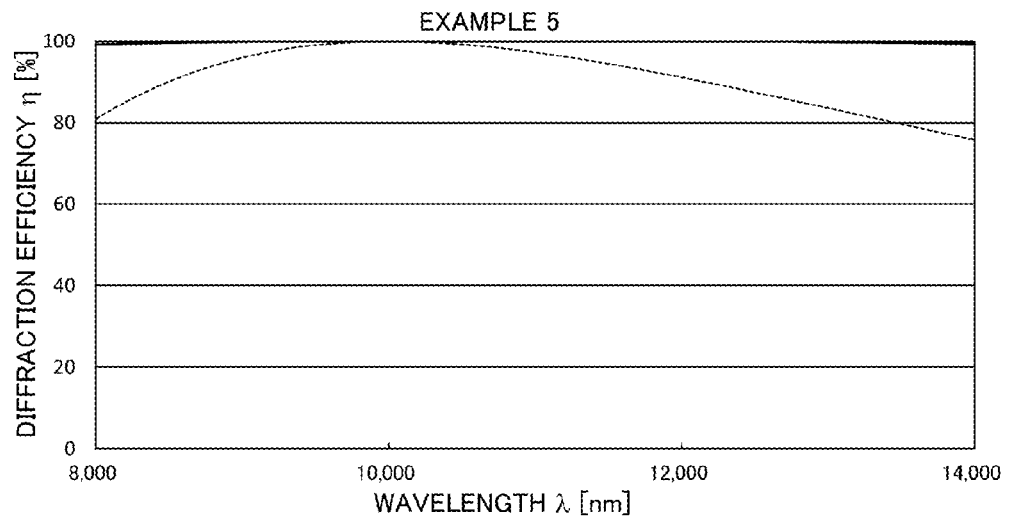
[Figure 8]
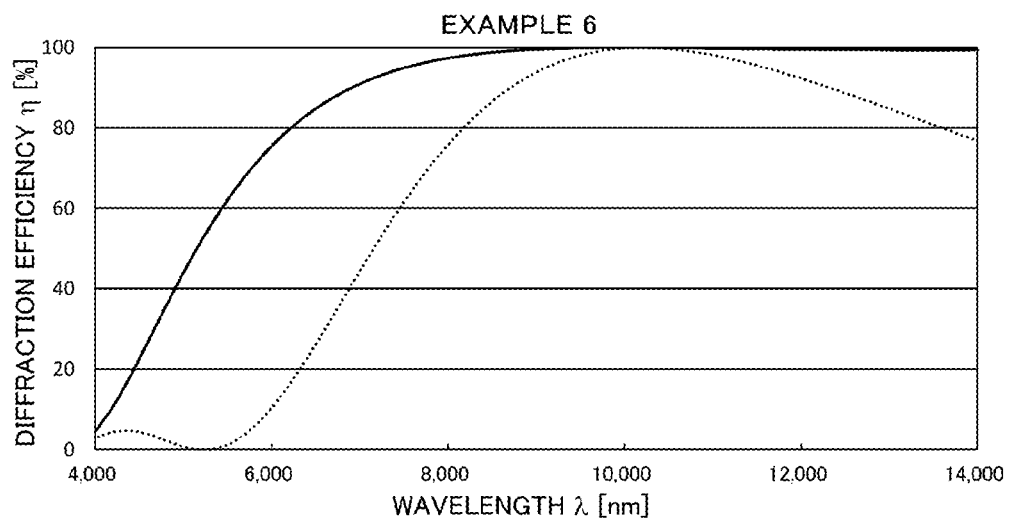

[Figure 9]
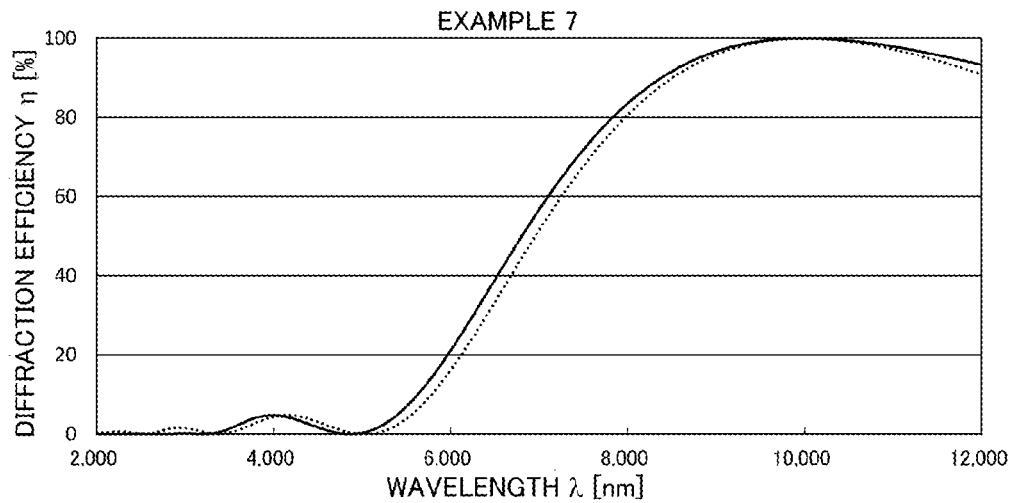
[Figure 10]
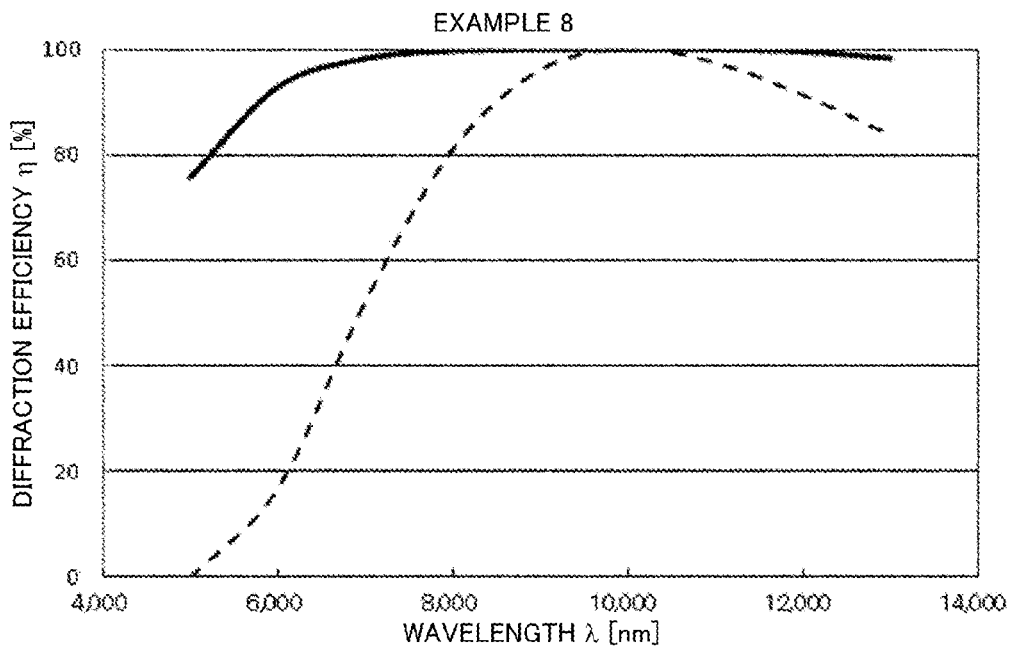

[Figure 11]
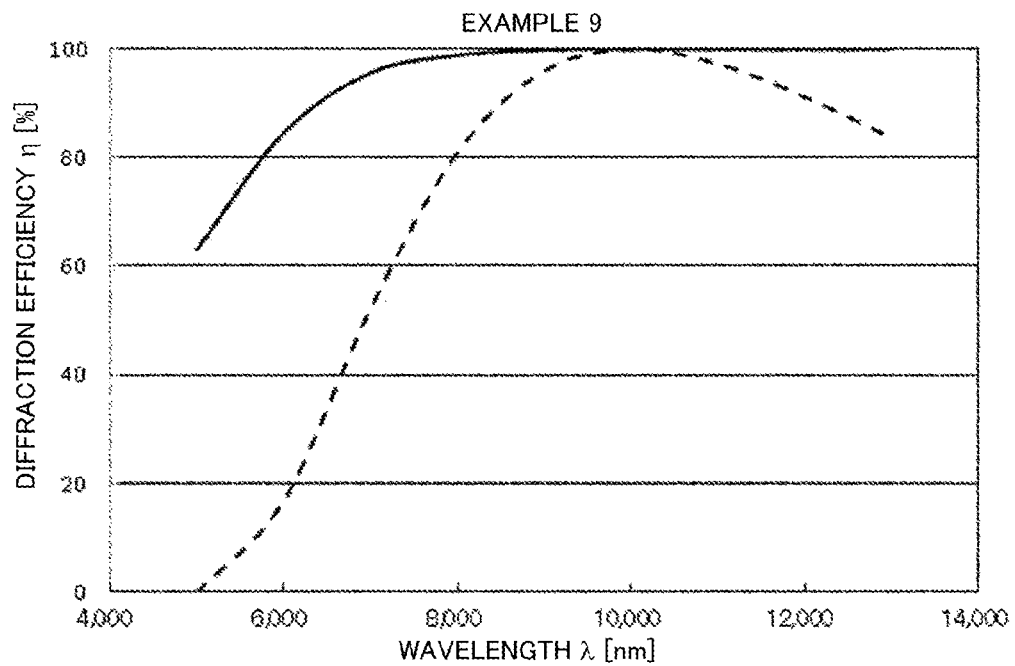
[Figure 12]
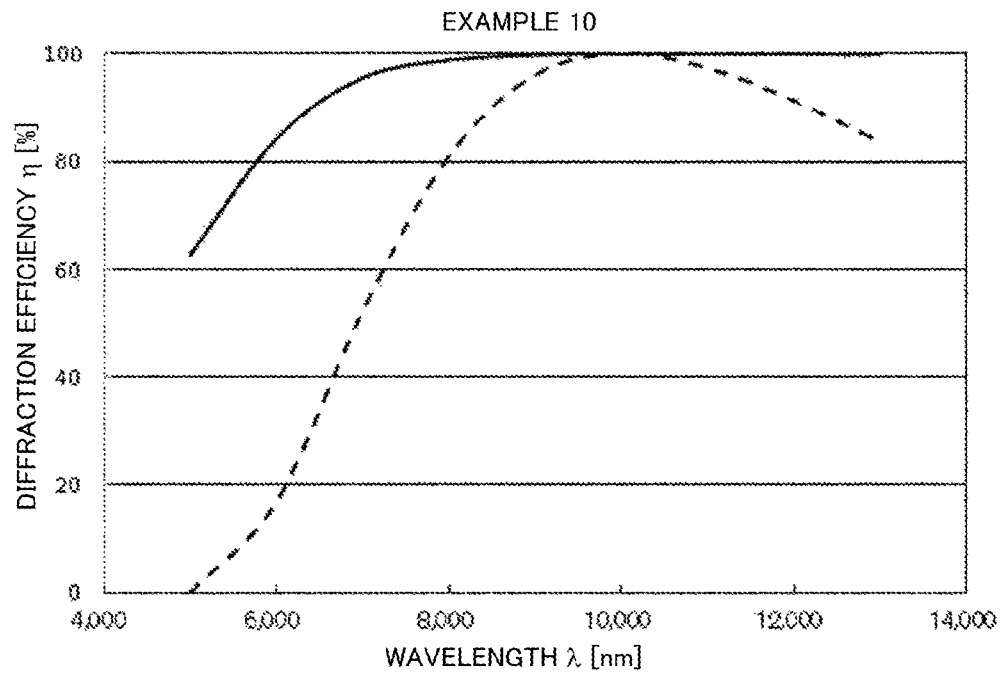

[Figure 13]
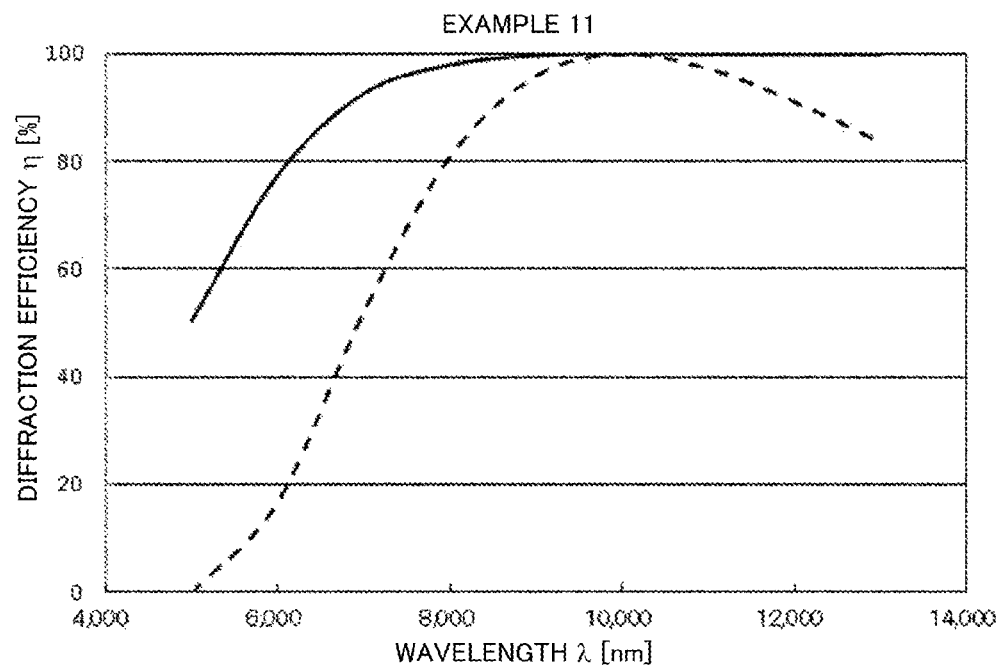

CONTACTED MULTILAYER DIFFRACTIVE OPTICAL ELEMENT

CROSS-REFERENCE TO RELATED APPLICATIONS

This application is the United States national phase of International Application No. PCT/JP2016/081443 filed Oct. 24, 2016, and claims priority to Japanese Patent Application Nos. 2015-219103 and 2016-203547, filed Nov. 9, 2015 and Oct. 17, 2016, respectively, the disclosures of which are hereby incorporated in their entirety by reference.

BACKGROUND OF THE INVENTION

Field of the Invention

The present invention relates to a contacted multilayer diffractive optical element, and specifically relates to a contacted multilayer diffractive optical element for an infrared optical system.

Description of Related Art

Conventionally, infrared optical systems have been used for various purposes such as thermal distribution analysis of an object in medical or industrial fields as well as monitoring and biometric authentication. Generally, an infrared optical system includes an infrared transmitting lens having a high refractive index for an infrared ray such as germanium (see, for example, "Patent Literature 1").

There are few types of glass materials for infrared transmitting lenses included in infrared optical systems compared with glass materials for visible light lenses. For example, germanium (Ge), chalcogenide glass, zinc sulfide (ZnS), zinc selenide (ZnSe), etc., are known as glass materials for infrared transmitting lenses. Germanium is a low-dispersion material, but is expensive. Thus, as glass materials for infrared transmitting lenses, chalcogenide glass, zinc sulfide or zinc selenide, which are relatively inexpensive, are often used.

In recent years, in visible light optical systems, chromatic aberration is corrected using a single-layer diffractive optical element. Use of a single-layer diffractive optical element enables effective correction of chromatic aberration and thus enables an optical system to be compactly configured. Generally, a diffraction grating structure of a single-layer diffractive optical element is determined so that a light flux in a use wavelength domain converges on a particular order (hereinafter referred to as "design order") and diffraction efficiency of diffracted light of the design order becomes maximum at a predetermined wavelength (hereinafter referred to as "design wavelength").

In infrared optical systems, also, chromatic aberration is corrected using a single-layer diffractive optical element. In particular, chalcogenide glass, zinc sulfide and zinc selenide are high-dispersion materials, and thus, a single-layer diffractive optical element is often used for correction of chromatic aberration.

However, diffraction efficiency of a single-layer diffractive optical element exhibits wavelength dependency, and thus, as wavelength deviation from a design wavelength is larger, the diffraction efficiency decreases more. Since in infrared optical systems, light insufficiency largely affects image quality, in particular, there is a need for use of a diffractive optical element having reduced wavelength dependency of diffraction efficiency.

For example, for visible light optical systems, contacted multilayer diffractive optical elements including two types of differently dispersing materials contacted with and stacked on each other and a diffraction grating structure provided at a boundary surface therebetween to reduce wavelength dependency of diffraction efficiency have been proposed (for example, see "Patent Literature 2" and "Patent Literature 3").

Certain Related Art Documents Include the Following:
[Patent Literature 1] Japanese Patent No. 5339720
[Patent Literature 2] Japanese Patent No. 3717555
[Patent Literature 3] Japanese Patent No. 5136358

However, no contacted multilayer diffractive optical element that can be employed for an infrared optical system is known. In the case of a contacted multilayer diffractive optical element, selection of materials to be contacted with and stacked on each other largely affects wavelength dependency of diffraction efficiency, and thus selection of materials is important. Also, depending on the combination of materials contacted with and stacked on each other, there may be difficulties in processing in manufacture such as difficulty in provision of a diffraction grating structure in a boundary surface and/or insufficiency of contact between the materials.

SUMMARY OF THE INVENTION

Therefore, an object of the present invention is to provide a contacted multilayer diffractive optical element having reduced wavelength dependency of diffraction efficiency, the contacted multilayer diffractive optical element facilitating processing in manufacture and being suitable for an infrared optical system, and an infrared optical system and an image pickup apparatus using the diffractive optical element.

In order to achieve the above object, a contacted multilayer diffractive optical element according to the present invention comprising a first layer consisting of a first chalcogenide glass material and a second layer consisting of a second chalcogenide glass material, the first chalcogenide glass material and the second chalcogenide glass material satisfying Expression (1) below and Expression (2) below, the first layer and the second layer being in contact with and stacked on each other, and a diffraction grating structure prescribed by Expression (i) below in a surface of the contact therebetween.

$$n1 < n2 \quad (1)$$

$$v1 < v2 \quad (2)$$

$$\Phi(r) = (\varphi_2 r^2 + \varphi_4 r^4 + \varphi_6 r^6 + \ldots) \times m/\lambda \quad (i)$$

wherein
n1 is a refractive index of the first chalcogenide glass material for a light ray of a wavelength $\lambda_I$,
n2 is a refractive index of the second chalcogenide glass material for the light ray of the wavelength $\lambda_I$,
v1 is an Abbe number of the first chalcogenide glass material for the light ray of the wavelength $\lambda_I$,
v2 is an Abbe number of the second chalcogenide glass material for the light ray of the wavelength $\lambda_I$,
$\Phi(r)$ is a phase difference function,
r is a length from an optical axis in a radial direction,
each of $\varphi_2, \varphi_4, \varphi_6 \ldots$ is an arbitrary coefficient,
m is a diffraction order,
$\lambda_I$ is an arbitrary wavelength of no less than 1 μm and no more than 18 μm, and λ is a design wavelength and is an arbitrary wavelength of no less than 1 μm and no more than 18 μm.

In the above, it is preferable that $\lambda_I = \lambda$.

Also, in order to achieve the above object, an infrared optical system according to the present invention comprises a contacted multilayer diffractive optical element according to the present invention.

Furthermore, in order to achieve the above object, an image pickup apparatus according to the present invention comprises an infrared optical system including a contacted multilayer diffractive optical element according to the present invention.

According to the present invention, a contacted multilayer diffractive optical element having reduced wavelength dependency of diffraction efficiency, the contacted multilayer diffractive optical element facilitating processing in manufacture and being suitable for an infrared optical system, and an infrared optical system and an image pickup apparatus using the diffractive optical element can be provided.

BRIEF DESCRIPTION OF THE DRAWINGS

FIGS. 2(a1)-(b3) are schematic diagrams illustrating an example of a method for manufacturing a contacted multilayer diffractive optical element according to the present embodiment;

FIG. 3 is a diagram indicating wavelength dependency of diffraction efficiency of each of a contacted multilayer diffractive optical element according to Example 1 (solid line) and a single-layer diffractive optical element (dotted line);

FIG. 4 is a diagram indicating wavelength dependency of diffraction efficiency of each of a contacted multilayer diffractive optical element according to Example 2 (solid line) and a single-layer diffractive optical element (dotted line);

FIG. 5 is a diagram indicating wavelength dependency of diffraction efficiency of each of a contacted multilayer diffractive optical element according to Example 3 (solid line) and a single-layer diffractive optical element (dotted line);

FIG. 6 is a diagram indicating wavelength dependency of diffraction efficiency of each of a contacted multilayer diffractive optical element according to Example 4 (solid line) and a single-layer diffractive optical element (dotted line);

FIG. 7 is a diagram indicating wavelength dependency of diffraction efficiency of each of a contacted multilayer diffractive optical element according to Example 5 (solid line) and a single-layer diffractive optical element (dotted line);

FIG. 8 is a diagram indicating wavelength dependency of diffraction efficiency of each of a contacted multilayer diffractive optical element according to Example 6 (solid line) and a single-layer diffractive optical element (dotted line);

FIG. 9 is a diagram indicating wavelength dependency of diffraction efficiency of each of a contacted multilayer diffractive optical element according to Example 7 (solid line) and a single-layer diffractive optical element (dotted line);

FIG. 10 is a diagram indicating wavelength dependency of diffraction efficiency of each of a contacted multilayer diffractive optical element according to Example 8 (solid line) and a single-layer diffractive optical element (dotted line);

FIG. 11 is a diagram indicating wavelength dependency of diffraction efficiency of each of a contacted multilayer diffractive optical element according to Example 9 (solid line) and a single-layer diffractive optical element (dotted line);

FIG. 12 is a diagram indicating wavelength dependency of diffraction efficiency of each of a contacted multilayer diffractive optical element according to Example 10 (solid line) and a single-layer diffractive optical element (dotted line); and FIG. 13 is a diagram indicating wavelength dependency of diffraction efficiency of each of a contacted multilayer diffractive optical element according to Example 11 (solid line) and a single-layer diffractive optical element (dotted line).

DESCRIPTION OF THE INVENTION

An embodiment of each of a contacted multilayer diffractive optical element, an infrared optical system and an image pickup apparatus according to the present invention will be described in turn below.

1. Contacted Multilayer Diffractive Optical Element 1-1. Basic Structure

Figure 1:
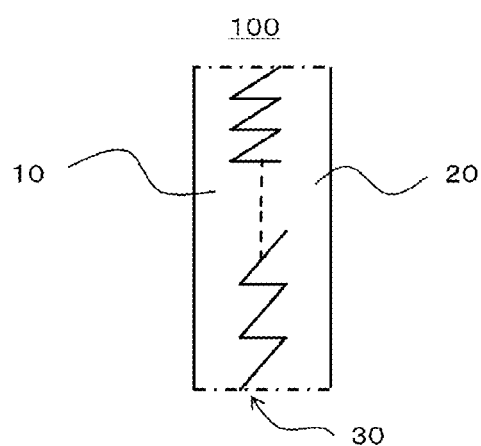
FIG. 1(a) is a schematic diagram illustrating an example cross-sectional configuration of a contacted multilayer diffractive optical element according to an embodiment of the present invention.
FIG. 1(b) is a schematic diagram illustrating an example cross-sectional shape of a diffraction grating structure represented in an isophase-difference coordinate system.
Figure 1:
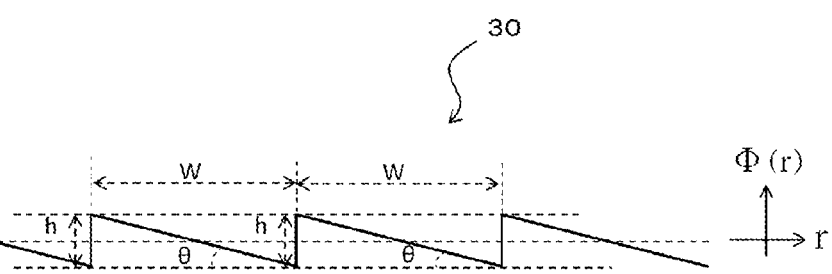

FIG. 1(a) schematically illustrates a cross-section of a contacted multilayer diffractive optical element 100 according to the present embodiment. The contacted multilayer diffractive optical element 100 illustrated in FIG. 1 includes a first layer 10 consisting of a first chalcogenide glass material and a second layer 20 consisting of a second chalcogenide glass material, the first chalcogenide glass material and the second chalcogenide glass material satisfying Expression (1) below and Expression (2) below, the first layer 10 and the second layer 20 being in contact with and stacked on each other, and a diffraction grating structure 30 prescribed by Expression (i) below in a surface of the contact therebetween.

$$n1 < n2 \quad (1)$$

$$v1 < v2 \quad (2)$$

$$\Phi(r) = (\varphi_2 r^2 + \varphi_4 r^4 + \varphi_6 r^6 + \ldots) \times m/\lambda \quad (i)$$

wherein n1 is a refractive index of the first chalcogenide glass material for a light ray of a wavelength $\lambda_I$, n2 is a refractive index of the second chalcogenide glass material for the light ray of the wavelength $\lambda_I$, v1 is an Abbe number of the first chalcogenide glass material for the light ray of the wavelength $\lambda_I$, v2 is an Abbe number of the second chalcogenide glass material for the light ray of the wavelength $\lambda_I$, Φ(r) is a phase difference function, r is a length from an optical axis in a same radial direction, each of $\varphi_2, \varphi_4, \varphi_6 \ldots$ is an arbitrary coefficient, m is a diffraction order, $\lambda_I$ is an arbitrary wavelength of no less than 1 μm and no more than 18 μm, and λ is a design wavelength and is an arbitrary wavelength of no less than 1 μm and no more than 18 μm.

Here, as described above, $\lambda_I$ is an arbitrary wavelength of no less than 1 μm and no more than 18 μm, and is preferably a usable wavelength region of the contacted multilayer diffractive optical element, for example, no less than 2 μm and no more than 15 μm or no less than 8 μm and no more than 14 μm. In the present embodiment, it is assumed that $\lambda_I=\lambda$, but $\lambda_I$ may be a wavelength that is different from the design wavelength λ.

Here, an Abbe number $\nu\lambda_I$ for a light ray of a wavelength $\lambda_I$ is defined by the following expression:

$$\nu\lambda_I=(n_I-1)/(n_J-n_K)$$

where $n_I$, $n_J$ and $n_K$ are respective refractive indexes for light rays of wavelengths $\lambda_I$, $\lambda_J$ and $\lambda_K$, $\lambda_I$, $\lambda_J$ and $\lambda_K$ are each an arbitrary wavelength of no less than 1 μm and no more than 18 μm, and are in a relationship of $\lambda_J<\lambda_I<\lambda_K$. For each of $\lambda_I$, $\lambda_J$, $\lambda_K$, an arbitrary wavelength can be employed as long as such arbitrary wavelengths satisfy the above conditions. In the present embodiment, it is assumed that $\lambda_I=10$ μm, $\lambda_J=9$ μm and $\lambda_K=11$ μm.

Since chalcogenide glass materials transmit infrared rays, the contacted multilayer diffractive optical element 100 including the first layer 10 consisting of the first chalcogenide glass material and the second layer 20 consisting of the second chalcogenide glass material, the first layer 10 and the second layer 20 being stacked on each other, is suitable for an infrared optical system. Also, the first chalcogenide glass material and the second chalcogenide glass material are materials that satisfy Expression (1) and Expression (2) below and are different from each other in refractive index and dispersion. The first layer 10 and the second layer 20 consisting of these chalcogenide glass materials being brought into contact with each other via the diffraction grating structure 30 enables obtainment of the contacted multilayer diffractive optical element 100 having reduced wavelength dependency of diffraction efficiency for a light ray in an infrared wavelength region. Also, the chalcogenide glass materials are materials that can easily be molded, and the diffraction grating structure can be formed by molding. Thus, in comparison with a case where a diffraction grating structure is formed by, e.g., cutting, processing in manufacture is easy, and also, mass production is possible. Therefore, the contacted multilayer diffractive optical element 100 according to the present embodiment enables provision of the contacted multilayer diffractive optical element 100 having reduced wavelength dependency of diffraction efficiency, the contacted multilayer diffractive optical element 100 facilitating processing in manufacture and being suitable for an infrared optical system.

(1) Diffraction Grating Structure

First, a cross-sectional shape of the contacted multilayer diffractive optical element 100 according to the present embodiment will be described. A phase difference function takes the form of a high-order polynomial like Expression (i) above for a radial direction. Here, for simplicity of description, where a coordinate system in which a radial direction is indicated in units of phase difference function is used, as illustrated in FIG. 1(b), a shape of diffraction steps has a periodic structure in which cross-sections of the respective diffraction steps (orbicular zones) are each shown by a same sawtooth shape. In this case, it is preferable that a diffraction step height where an optical path length difference provided by adjacent orbicular zones at the design wavelength λ is 1λ be no less than 0.01 mm and no more than 1.50 mm. Setting the diffraction step height where the optical path length difference provided by the adjacent orbicular zones at the design wavelength is 1λ to be no less than 0.01 mm and no more than 1.50 mm facilitates reduction in wavelength dependency of diffraction efficiency. Concurrently with this, the diffraction grating structure 30 can easily be formed in the surface of the contact between the first chalcogenide glass material and the second chalcogenide glass material. In other words, there are some cases such as a case where the diffraction grating structure 30 is formed directly in the contact surface and a case where the diffraction grating structure 30 is formed by, e.g. molding using a mold, but in any of these cases, if a height of each diffraction step falls within the aforementioned range, machining for forming the diffraction grating structure 30 is easy. However, the optical path length difference is not limited to 1λ and may be no less than 0.6λ and no more than 1.4λ, and a height of each diffraction step actually formed in a diffractive surface (diffraction step height) only needs to be no less than 0.02 mm and no more than 1.20 mm.

Here, for, e.g., optimization of wavelength dependency of diffraction efficiency, a specific shape of each diffraction step illustrated in FIG. 1(b) can arbitrarily be changed. Arbitrarily changing e.g., a width, the height and an inclination angle of each diffraction step according to, e.g., the design wavelength and the refractive index of two chalcogenide glass materials stacked enables reduction in wavelength dependency of diffraction efficiency in a wider wavelength range in the infrared wavelength region. Also, in the example illustrated in FIG. 1(b), where represented in an isophase-difference coordinate system, the respective diffraction steps have a same sawtooth shape in cross-section; however, the shape in cross-section of the diffraction steps is not limited to this shape. For example, from among the diffraction steps provided in the contact surface, some diffraction steps may be different from the other diffraction steps in any one or more of the width, the height and the inclination angle. Making a shape of some diffraction steps be a shape that is different from a shape of the other diffraction steps may enable further reduction in wavelength dependency of diffraction efficiency.

(2) Molding

A method for manufacturing the contacted multilayer diffractive optical element 100 is not specifically limited; however, as described above, chalcogenide glass materials are generally materials that can easily be molded, and thus, it is preferable to manufacture the contacted multilayer diffractive optical element 100 by means of molding. For example, the following method can be employed. Here, the below description will be provided conveniently assuming that a softening point, etc., (including a softening point, a glass transition point and a glass deformation point; the same applies hereinafter) of the first chalcogenide glass material is higher than a softening point, etc., of the second chalcogenide glass material. First, the first chalcogenide glass material (10) is pressed to a mold 50 to form the first layer 10 consisting of the first chalcogenide glass material, the first layer 10 having a predetermined shape including the diffraction grating structure 30 (see FIG. 2(a1)). Next, using the first layer 10 as a part of the mold (see FIG. 2(a2)), the second chalcogenide glass material (20) is pressed to the first layer 10 to bring the second chalcogenide glass material into contact with the first layer 10 and transfer the diffraction grating structure 30 to the second chalcogenide glass material (20). Consequently, the contacted multilayer diffractive optical element 100 according to the present embodiment including the first layer 10 consisting of the first chalcogenide glass material and the second layer 20 consisting of the second chalcogenide glass material, the first layer 10 and the second layer 20 being in contact with and stacked on each other, and the diffraction grating structure 30 in a surface of the contact therebetween (see FIG. 2(*a*3)) can be obtained. However, if the softening point, etc., of the second chalcogenide glass material is higher than the softening point, etc., of the first chalcogenide glass material, the order is reversed. In other words, the second chalcogenide glass material is pressed to the mold 50 and then the first chalcogenide glass material is pressed to the second chalcogenide glass material to bring both chalcogenide glass materials into contact with each other.

Employment of such method makes it easy to form the diffraction grating structure 30 in a surface of the contact between the first layer 10 consisting of the first chalcogenide glass material and the second layer 20 consisting of the second chalcogenide glass material, and enables provision of favorable contact between both chalcogenide glass materials. Also, mass production of the contacted multilayer diffractive optical element 100 is facilitated. However, as described above, the method for manufacturing the contacted multilayer diffractive optical element 100 is not specifically limited. For example, the contacted multilayer diffractive optical element 100 may be manufactured by, e.g., forming the diffraction grating structure 30 in each of the first chalcogenide glass material and the second chalcogenide glass material in advance by means of, e.g., ultra-precision machining and bonding or joining the first chalcogenide glass material and the second chalcogenide glass material to each other with respective diffractive surfaces including the respective diffraction grating structures 30 formed therein (see (b1), (b2) and (b3) in FIG. 2) as a surface of the contact therebetween. Also, it is possible that the diffraction grating structure 30 is formed in advance in the first chalcogenide glass material, the second chalcogenide glass material (20) is pressed to the first layer 10 to bring the second chalcogenide glass material into contact with the first layer 10 and transfer the diffraction grating structure 30 to the second chalcogenide glass material (20).

1-2. Chalcogenide Glass Material

Next, the first chalcogenide glass material and the second chalcogenide glass material will be described. In the contacted multilayer diffractive optical element 100 according to the present embodiment, the first chalcogenide glass material and the second chalcogenide glass material only need to satisfy Conditional Expression (1) and Conditional Expression (2) above, and as long as Conditional Expression (1) and Conditional Expression (2) are satisfied, are not limited in physical property and composition. However, from the perspective of obtaining a contacted multilayer diffractive optical element 100 having reduced wavelength dependency of diffraction efficiency, the contacted multilayer diffractive optical element 100 facilitating processing in manufacture and being suitable for an infrared optical system, it is preferable that the first chalcogenide glass material and the second chalcogenide glass material form a combination that satisfies the below conditions from the aspect of physical properties and the aspect of composition.

1-2-1. Physical Properties

It is preferable that a combination of the first chalcogenide glass material and the second chalcogenide glass material be a combination that satisfies at least any one of the below thermal properties and optical properties.

(1) Thermal Properties i) Glass Transition Point Temperature Difference

It is preferable that a glass transition point temperature difference between the first chalcogenide glass material and the second chalcogenide glass material be no less than 10° C. Where the glass transition point temperature difference between the first chalcogenide glass material and the second chalcogenide glass material be no less than 10° C., from among both chalcogenide glass materials, a chalcogenide glass material whose glass transition point temperature is higher can easily be maintained in a glass state even if the other chalcogenide glass material having a lower glass transition point is softened. Thus, the contacted multilayer diffractive optical element 100 according to the present embodiment can be manufactured by means of molding such as illustrated in FIG. 2, and thus processing in manufacture is facilitated.

If the glass transition point temperature difference between the first chalcogenide glass material and the second chalcogenide glass material is less than 10° C., it is difficult to, while one chalcogenide glass material is kept in the glass state, soften other chalcogenide glass material when the one chalcogenide glass material is brought into contact with and stacked on the other chalcogenide glass material by means of molding. Thus, the diffraction grating structure fails to be maintained, and therefore, it is necessary to employ a method, other than molding, in stacking the first chalcogenide glass material and the second chalcogenide glass material on each other in contact with each other. If the first layer 10 consisting of the first chalcogenide glass material and the second layer 20 consisting of the second chalcogenide glass material are stacked on each other in contact with each other by means of a method other than molding, it is necessary to form the diffraction grating structure 30 in advance in each of the first chalcogenide glass material and the second chalcogenide glass material and then bond both chalcogenide glass materials to each other via an adhesive. Provision of an adhesive between the first chalcogenide glass material and the second chalcogenide glass material is unfavorable because Conditional Expression (1) and Conditional Expression (2) fail to be satisfied.

From the above perspective, it is more preferable that the glass transition point temperature difference between the first chalcogenide glass material and the second chalcogenide glass material be no less than 30° C. If the glass transition point temperature difference between the first chalcogenide glass material and the second chalcogenide glass material is no less than 30° C., when the first chalcogenide glass material and the second chalcogenide glass material are stacked on each other in contact with each other by means of molding, while one chalcogenide glass material is maintained in a glass state, the other chalcogenide glass material can be brought into contact with and stacked on the one chalcogenide glass material, further facilitating maintenance of the diffraction grating structure 30 formed in the surface of the contact. Thus, processing in manufacturing the contacted multilayer diffractive optical element 100 is more facilitated.

Glass transition point temperatures of chalcogenide glass materials are roughly 90° C. to 400° C. No specific upper limit of the glass transition point temperature difference between the first chalcogenide glass material and the second chalcogenide glass material is provided, but is properly no more than 250° C.

ii) Glass Deformation Point Temperature Difference

It is preferable that a glass deformation point temperature difference between the first chalcogenide glass material and the second chalcogenide glass material be no less than 10° C. As in the case of the glass transition point temperature difference, if the glass deformation point temperature difference between the first chalcogenide glass material and the second chalcogenide glass material is no less than 10° C., the first chalcogenide glass material and the second chalcogenide glass material can be brought into contact with and stacked on each other by means of molding, and the diffraction grating structure 30 can easily be provided in the surface of the contact.

From the above perspective, as in the case of the glass transition point temperature difference, it is more preferable that the glass deformation point temperature difference between the first chalcogenide glass material and the second chalcogenide glass material be no less than 30° C. Also, as in the case of the glass transition point temperature difference, no specific upper limit of the glass deformation point temperature difference between the first chalcogenide glass material and the second chalcogenide glass material is provided, but is properly no more than 250° C.

iii) Thermal Expansion Coefficient Difference

It is preferable that a thermal expansion coefficient difference between the first chalcogenide glass material and the second chalcogenide glass material be within $100 \times 10^{-7}/°$ C. If the thermal expansion coefficient difference falls within such range, the first chalcogenide glass material and the second chalcogenide glass material can be brought into contact with and stacked on each other by means of molding and the diffraction grating structure 30 can easily be provided in the surface of the contact. Also, as long as the thermal expansion coefficient difference falls within the range, even when an atmospheric temperature changes, favorable contact between the first chalcogenide glass material and the second chalcogenide glass material can be maintained.

On the other hand, if the thermal expansion coefficient difference between the first chalcogenide glass material and the second chalcogenide glass exceeds $100 \times 10^{-7}/°$ C., that is, if the thermal expansion coefficient difference becomes large, when an atmospheric temperature changes, the diffraction grating structure 30 provided in the surface of the contact changes, unfavorably resulting in decrease in contact with the other chalcogenide glass material.

From the above perspective, it is more preferable that the thermal expansion coefficient difference between the first chalcogenide glass material and the second chalcogenide glass material be within $80 \times 10^{-7}/°$ C.

(2) Optical Properties

Next, selection of the first chalcogenide glass material and the second chalcogenide glass material will be described from the optical perspective. It is preferable that any one conditional expression of Conditional Expression (3), Conditional Expression (4) and Conditional Expression (5) indicated below be satisfied in addition to Conditional Expression (1) and Conditional Expression (2).

i) Conditional Expression (1)

Conditional Expression (1) is as described above. In other words, a condition that the refractive index (n1) of the first chalcogenide glass material for the light ray of the wavelength $\lambda_I$ is lower than the refractive index (n2) of the second chalcogenide glass material for the light ray of the wavelength $\lambda_I$ is provided. As long as the refractive indexes (n1, n2) of the first chalcogenide glass material and the second chalcogenide glass material satisfy Conditional Expression (1), numerical values of the refractive indexes (n1, n2) are not specifically limited.

ii) Conditional Expression (2)

Conditional Expression (2) is also as described above. In other words, the condition that the Abbe number (v1) of the first chalcogenide glass material for the light ray of the wavelength $\lambda_I$ is lower than the Abbe number (v2) of the second chalcogenide glass material for the light ray of the wavelength $\lambda_I$ is provided. Here, as long as the Abbe numbers (v1, v2) of the first chalcogenide glass material and the second chalcogenide glass material satisfy Conditional Expression (2), numerical values of the Abbe numbers (v1, v2) are not specifically limited. However, from the perspective of reducing wavelength dependency of diffraction efficiency in a wider wavelength range, the Abbe number (v1) of the first chalcogenide glass material for the light ray of the wavelength $\lambda_I$ is preferably no more than 250, more preferably no more than 230.

iii) Conditional Expression (3) First, Conditional Expression (3) will be described.

It is preferable that the first chalcogenide glass material and the second chalcogenide glass material each satisfy Conditional Expression (3) in addition to Conditional Expression (1) and Conditional Expression (2) above.

$$-0.025\alpha+2.6<\alpha(n-1)/v+n<-0.028\alpha+2.9 \qquad (3)$$

However, in the expression (3) above, n is a refractive index of the chalcogenide glass material for the light ray of the wavelength $\lambda_I$, $2.50<n<3.00$, v is an Abbe number of the chalcogenide glass material for the light ray of the wavelength $\lambda_I$, $20<v<600$, and $\alpha$ is an arbitrary numerical value satisfying $-1.5<\alpha<-5.0$.

Selection of the first chalcogenide glass material and the second chalcogenide glass material from among materials satisfying Conditional Expression (1) and Conditional Expression (2) and also satisfying Conditional Expression (3) enables provision of the contacted multilayer diffractive optical element 100 having reduced wavelength dependency of diffraction efficiency in a wider wavelength range in the infrared wavelength region. Thus, decrease in amount of light attributable to wavelength dependency of diffraction efficiency can more effectively be suppressed. Also, since an amount of diffracted light of an order that is not the design order (undesirable diffracted light) decreases, e.g., generation of an unwanted diffraction flare can be suppressed. Therefore, use of the contacted multilayer diffractive optical element 100 satisfying such conditions enables provision of a smaller infrared optical system having higher imaging performance.

If Conditional Expression (3) is satisfied, the Abbe number (v1) of the first chalcogenide glass material for the light ray of the wavelength $\lambda_I$ is more preferably no more than 200, even more preferably no more than 100.

iv) Conditional Expression (4)

Next, Conditional Expression (4) will be described. It is preferable that the first chalcogenide glass material and the second chalcogenide glass material each satisfy Conditional Expression (4) indicated below in addition to Conditional Expression (1) and Conditional Expression (2) above.

$$-0.024\alpha+2.4<\alpha(n-1)/v+n<-0.025\alpha+2.7 \qquad (4)$$

However, in Conditional Expression (4), n is a refractive index of the chalcogenide glass material for the light ray of the wavelength $\lambda_I$, $2.50<n<2.80$, v is an Abbe number of the chalcogenide glass material for the light ray of the wavelength $\lambda_I$, $50<v<600$, and $\alpha$ is an arbitrary numerical value satisfying $-1.5<\alpha<-5.0$.

Selection of the first chalcogenide glass material and the second chalcogenide glass material from among materials satisfying Conditional Expression (1) and Conditional Expression (2) and also satisfying Conditional Expression (4) enables provision of effects that are similar to those in the case of Conditional Expression (3). In other words, the contacted multilayer diffractive optical element 100 having reduced wavelength dependency of diffraction efficiency in a wider wavelength range in the infrared wavelength region can be provided, and decrease in amount of light attributable to wavelength dependency of diffraction efficiency can more effectively be suppressed, and e.g., generation of an unwanted diffraction flare attributable to undesirable diffracted light can be suppressed. Therefore, use of the contacted multilayer diffractive optical element 100 satisfying such conditions enables provision of a smaller infrared optical system having higher imaging performance.

If Conditional Expression (4) is satisfied, as described above, the Abbe number (ν1) of the first chalcogenide glass material for the light ray of the wavelength $\lambda_I$ is more preferably no more than 250, even more preferably no more than 230.

v) Conditional Expression (5)

Next, Conditional Expression (5) will be described. It is preferable that the first chalcogenide glass material and the second chalcogenide glass material each satisfy Conditional Expression (5) indicated below in addition to Conditional Expression (1) and Conditional Expression (2).

$$-0.036\alpha+2.3<\alpha(n-1)/\nu+n<-0.039\alpha+2.5 \quad (5)$$

However, in Conditional Expression (5), n is a refractive index of the chalcogenide glass material for the light ray of the wavelength $\lambda_I$, 2.40<n<2.60, ν is an Abbe number of the chalcogenide glass material for the light ray of the wavelength $\lambda_I$, 50<ν<600, and α is an arbitrary numerical value satisfying −1.5<α<−5.0.

Selection of the first chalcogenide glass material and the second chalcogenide glass material from among materials satisfying Conditional Expression (1) and Conditional Expression (2) and also satisfying Conditional Expression (5) enables provision of effects that are similar to those in the case of Conditional Expression (3). In other words, the contacted multilayer diffractive optical element 100 having reduced wavelength dependency of diffraction efficiency in a wider wavelength range in the infrared wavelength region can be provided, and decrease in amount of light attributable to wavelength dependency of diffraction efficiency can more effectively be suppressed, and e.g., generation of an unwanted diffraction flare attributable to undesirable diffracted light can be suppressed. Therefore, use of the contacted multilayer diffractive optical element 100 satisfying such conditions enables provision of a smaller infrared optical system having higher imaging performance.

If Conditional Expression (5) is satisfied, the Abbe number (ν1) of the first chalcogenide glass material for the light ray of the wavelength $\lambda_I$ is more preferably no more than 220.

Next, Conditional Expression (6) will be described. It is preferable that the first chalcogenide glass material and the second chalcogenide glass material each satisfy Conditional Expression (6) indicated below in addition to Conditional Expression (1) and Conditional Expression (2) above.

$$-0.035\alpha+2.3<\alpha(n-1)/\nu+n<-0.028\alpha+2.9 \quad (6)$$

However, in Conditional Expression (6), n is a refractive index of the chalcogenide glass material for the light ray of the wavelength $\lambda_I$, 2.40<n<3.00, ν is an Abbe number of the chalcogenide glass material for the light ray of the wavelength $\lambda_I$, 20<ν<600, and α is an arbitrary numerical value satisfying −1.5<α<−5.0.

Selection of the first chalcogenide glass material and the second chalcogenide glass material from among materials satisfying Conditional Expression (1) and Conditional Expression (2) and also satisfying Conditional Expression (6) enables provision of effects that are similar to those in the case of Conditional Expression (3). In other words, the contacted multilayer diffractive optical element 100 having reduced wavelength dependency of diffraction efficiency in a wider wavelength range in the infrared wavelength region can be provided, and decrease in amount of light attributable to wavelength dependency of diffraction efficiency can more effectively be suppressed, and e.g., generation of an unwanted diffraction flare attributable to undesirable diffracted light can be suppressed. Therefore, use of the contacted multilayer diffractive optical element 100 satisfying such conditions enables provision of a smaller infrared optical system having higher imaging performance.

1-2-2. Composition

Next, compositions of the first chalcogenide glass material and the second chalcogenide glass material will be described. It is preferable that the first chalcogenide glass material and the second chalcogenide glass material satisfy any one composition condition of first to third composition conditions indicated below.

(1) First Composition Condition

As a first composition condition, it is preferable that the first chalcogenide glass material and the second chalcogenide glass material have the compositions below.

Composition of the First Chalcogenide Glass Material:

no less than 2 mol % and no more than 25 mol % of any one or more of Ge and Ga, no less than 6 mol % and no more than 38 mol % of any one or more of Sb and Bi, no less than 1 mol % and no more than 25 mol % of any one or more of Sn and Zn, and no less than 58 mol % and no more than 80 mol % of any one or more of S, Se and Te.

Composition of the Second Chalcogenide Glass Material:

no less than 22 mol % and no more than 73 mol % of Se, and no less than 3 mol % and no more than 50 mol % of As.

Here, the second chalcogenide glass material may contain no more than 20 mol % of at least any one of Ge, Te, Sb and Sn in addition to Se and As above.

However, each of the above compositions is one in which a composition ratio of each element in the entire composition is expressed in a molar ratio (mol %), and the first chalcogenide glass material only needs to contain any one or more of Ge and Ga, any one or more of Sb and Bi, any one or more of Sn and Zn and any one or more of S, Se and Te within the respective composition ratios and may contain another element. The same applies to the second chalcogenide glass material. Also, the same applies to a second composition condition.

If the first chalcogenide glass material and the second chalcogenide glass material have the above compositions, Conditional Expression (1), Conditional Expression (2) and Conditional Expression (3) described above are satisfied. Also, conditions relating to physical properties (thermal properties and optical properties) are also satisfied, enabling provision of the aforementioned effects.

(2) Second Composition Conditions

As the second composition condition, it is preferable that the first chalcogenide glass material and the second chalcogenide glass material have the compositions below.

Composition of the First Chalcogenide Glass Material:
no less than 50 mol % and no more than 75 mol % of Se,
no less than 10 mol % and no more than 38 mol % of Ge, and
no less than 2 mol % and no more than 25 mol % of Sb.

Composition of the Second Chalcogenide Glass Material:
no less than 40 mol % and no more than 60 mol % of Se, and
no less than 30 mol % and no more than 50 mol % of Ge.

Here, the second chalcogenide glass material may contain no more than 20 mol % of As in addition to Se and Ge above.

If the first chalcogenide glass material and the second chalcogenide glass material have the above compositions, Conditional Expression (1), Conditional Expression (2) and Conditional Expression (4) described above are satisfied. Also, conditions relating to physical properties (thermal properties and optical properties) are also satisfied, enabling provision of the aforementioned effects.

(3) Third Composition Condition

As a third composition condition, it is preferable that the first chalcogenide glass material and the second chalcogenide glass material have the compositions below.

Composition of First Chalcogenide Glass Material:
no less than 40 mol % and no more than 70 mol % of Se,
no less than 15 mol % and no more than 40 mol % of Ge, and
no less than 5 mol % and no more than 30 mol % of any one or more of Sb and As.

Composition of Second Chalcogenide Glass Material:
no less than 40 mol % and no more than 65 mol % of Se,
no less than 20 mol % and no more than 50 mol % of As, and
no less than 5 mol % and no more than 15 mol % of Ge.

If the first chalcogenide glass material and the second chalcogenide glass material have the above compositions, Conditional Expression (1), Conditional Expression (2) and Conditional Expression (5) described above are satisfied. Also, conditions relating to physical properties (thermal properties and optical properties) are also satisfied, enabling provision of the aforementioned effects.

2. Infrared Optical System

Next, an embodiment of an infrared optical system according to the present invention will be described. The infrared optical system according to the present embodiment only needs to include the contacted multilayer diffractive optical element 100 described above, and is not specifically limited in terms of the rest of configuration. For example, the infrared optical system can be configured by the contacted multilayer diffractive optical element 100 alone or a combination of the contacted multilayer diffractive optical element 100 and one or more optical elements (e.g., an infrared transmitting lens), and may be configured as a single focus lens whose focal length is fixed or a variable-focal-length lens whose focal length is variable. According to the infrared optical system, use of the contacted multilayer diffractive optical element 100 enables favorable correction of, e.g., chromatic aberration, and high imaging performance can be achieved with a smaller number of optical elements. Concurrently with this, decrease in amount of light attributable to wavelength dependency of diffraction efficiency can be suppressed. Also, since the infrared optical system can be configured by a small number of optical elements, infrared absorption in the respective optical elements can be suppressed. Therefore, a smaller and brighter infrared optical system having high imaging performance can be provided.

3. Image Pickup Apparatus

Next, an embodiment of an image pickup apparatus according to the present invention will be described. The image pickup apparatus according to the present embodiment includes an infrared optical system including the contacted multilayer diffractive optical element 100 described above. For example, the image pickup apparatus can include the infrared optical system, and e.g., an infrared sensor provided on the image plane side of the infrared optical system, the infrared sensor converting an infrared optical image formed by the infrared optical system into an electrical signal. The image pickup apparatus according to the present invention includes the infrared optical system including the contacted multilayer diffractive optical element 100 described above and thus can provide a clearly outlined subject image by means of infrared light even in night time or bad weather and is suitable for, e.g., an image pickup apparatus for monitoring. Furthermore, the image pickup apparatus according to the present invention is suitable for a medical diagnostic imaging apparatus to be used in a test for, e.g., lung cancer.

Next, the present invention will be described in detail indicating examples and comparative examples. However, the present invention is not limited the below examples.

Example 1

In Example 1, a contacted multilayer diffractive optical element according to the present invention was manufactured by the method using a mold, which is illustrated in FIG. 2, using a first chalcogenide glass material and a second chalcogenide glass material having the below physical properties and compositions.

[First Chalcogenide Glass Material] (IIR-SF1 Manufactured by Isuzu Glass Ltd.)

i) Physical Properties

Thermal properties: glass transition point of 233° C., glass deformation point of 253° C., softening point of 278° C., thermal expansion coefficient of $156 \times 10^{-7}$/° C.

Optical properties: refractive index (n1) of 2.724, Abbe number (v1) of 64

Here, the refractive index is a value for a light ray of a wavelength of 10 μm ($\lambda_I$=10 μm). As mentioned above, the Abbe number is a value where it is assumed that $\lambda_I$=10 μm, $\lambda_J$=9 μm and $\lambda_K$=11 μm. The same applies to the below examples.

ii) Composition (S—Sb—Sn—Ge)

S: 65 mol %

Sb: 30 mol %

Sn: 3 mol %

Ge: 2 mol %

[Second Chalcogenide Glass Material] (C-1 Manufactured by Amorphous Materials Inc.)

i) Physical Properties

Thermal properties: glass transition point of 167° C., glass deformation point of 188° C., softening point of 209° C., thermal expansion coefficient of $230 \times 10^{-7}$/° C.

Optical properties: refractive index (n2) of 2.8051, Abbe number of 384
ii) Composition (As—Se—Te)
As: 40 mol %
Se: 40 mol %
Te: 20 mol %
[Diffraction Surface Data]
Design wavelength λ (blaze wavelength): 10 μm
Design order m: 1
Diffraction step height where an optical path length difference provided by adjacent orbicular zones at a design wavelength λ is 1λ: 0.125 mm
Diffraction step height where the optical path length difference is 0.6λ: 0.075 mm
Diffraction step height where the optical path length difference is 1.4λ: 0.175 mm
However, since the optical path length difference and the diffraction step height are in proportion to each other, in the present example, as described above, the diffraction step height takes a value of 0.075 mm to 0.175 mm according to a value of 0.6λ to 1.4λ of the optical path length difference.

In FIG. 3, wavelength dependency of diffraction efficiency of the contacted multilayer diffractive optical element according to Example 1 is indicated by a solid line. In FIG. 3, the dotted line indicates wavelength dependency of diffraction efficiency of a single-layer diffractive optical element consisting of the first chalcogenide glass material. As illustrated in FIG. 3, it can be seen that as a result of the first chalcogenide glass material and the second chalcogenide glass material being brought into contact with and stacked on each other via a diffraction grating structure, wavelength dependency of diffraction efficiency was improved in a wider wavelength range.

Example 2

In Example 2, a contacted multilayer diffractive optical element according to the present invention was manufactured using a first chalcogenide glass material (IIR-SF1 manufactured by Isuzu Glass Ltd.) that is the same as that in Example 1 in such a manner that is similar to that of Example 1 except use of a second chalcogenide glass material having the below physical properties and composition.
[Second Chalcogenide Glass Material] (IRG23 Manufactured by SCHOTT AG)
i) Physical Properties
Thermal properties:
glass transition point of 275° C., glass deformation point of 295° C., softening point of 305° C., thermal expansion coefficient of $134 \times 10^{-7}$/° C.
Optical properties: refractive index (n2) of 2.7869, Abbe number of 337
ii) Composition (Ge—As—Se—Te)
Ge: 30 mol %
As: 13 mol %
Se: 32 mol %
Te: 25 mol %
[Diffraction Surface Data]
Design wavelength λ: 10 μm
Design order m: 1
Diffraction step height where an optical path length difference provided by adjacent orbicular zones at a design wavelength λ is 1λ: 0.160 mm
Diffraction step height where the optical path length difference is 0.6λ: 0.096 mm
Diffraction step height where the optical path length difference is 1.4λ: 0.224 mm
However, since the optical path length difference and the diffraction step height are in proportion to each other, in the present example, as described above, the diffraction step height takes a value of 0.096 mm to 0.224 mm according to a value of 0.6λ to 1.4λ of the optical path length difference.

In FIG. 4, wavelength dependency of diffraction efficiency of the contacted multilayer diffractive optical element according to Example 2 is indicated by a solid line. In FIG. 4, the dotted line indicates wavelength dependency of diffraction efficiency of a single-layer diffractive optical element consisting of the first chalcogenide glass material. As illustrated in FIG. 4, in the case of Example 2, also, it can be seen that as a result of the first chalcogenide glass material and the second chalcogenide glass material being brought into contact with and stacked on each other via a diffraction grating structure, wavelength dependency of diffraction efficiency was improved in a wider wavelength range.

Example 3

In example 3, a contacted multilayer diffractive optical element according to the present invention was manufactured using a first chalcogenide glass material (IIR-SF1 manufactured by Isuzu Glass Ltd.) that is the same as that in Example 1 in such a manner that is similar to that of Example 1 except use of a second chalcogenide glass material having the below physical properties and composition.
[Second Chalcogenide Glass Material] (IG6 Manufactured by VITRON Spezialwerkstoffe GmbH)
i) Physical Properties
Thermal properties:
glass transition point of 180° C., glass deformation point of 185° C., softening point of 217° C., thermal expansion coefficient $207 \times 10^{-7}$/° C.
Optical properties: refractive index (n2) of 2.7781, Abbe number of 317
ii) Composition (Se—As)
Se: 60 mol %
As: 40 mol %
[Diffraction Surface Data]
Design wavelength λ: 10 μm
Design order m: 1
Diffraction step height where an optical path length difference provided by adjacent orbicular zones at a design wavelength λ is 1λ: 0.188 mm
Diffraction step height where the optical path length difference is 0.6λ: 0.113 mm
Diffraction step height where the optical path length difference is 1.4λ: 0.263 mm
However, since the optical path length difference and the diffraction step height are in proportion to each other, in the present example, as described above, the diffraction step height takes a value of 0.113 mm to 0.263 mm according to a value of 0.6λ to 1.4λ of the optical path length difference.

In FIG. 5, wavelength dependency of diffraction efficiency of the contacted multilayer diffractive optical element according to Example 3 is indicated by a solid line. In FIG. 5, the dotted line indicates wavelength dependency of diffraction efficiency of a single-layer diffractive optical element consisting of the first chalcogenide glass material. As indicated in FIG. 5, in the case of Example 3, also, it can be seen that as a result of the first chalcogenide glass material and the second chalcogenide glass material being brought into contact with and stacked on each other via a diffraction grating structure, wavelength dependency of diffraction efficiency was improved in a wider wavelength range.

Example 4

In Example 4, a contacted multilayer diffractive optical element according to the present invention was manufactured in such a manner that is similar to that of Example 1 except use of a first chalcogenide glass material and a second chalcogenide glass material having the physical properties and compositions below.
[First Chalcogenide Glass Material] (IRG203 Manufactured by Hubei New Huaguang Information Materials Co., Ltd.)
i) Physical Properties
Thermal properties:
glass transition point of 266° C., glass deformation point of 285° C., softening point of 304° C., thermal expansion coefficient of $157 \times 10^{-7}$/° C.
Optical properties: refractive index (n1): 2.5886, Abbe number of 125
ii) Composition (Se—Ge—Sb)
Se: 65 mol %
Ge: 20 mol %
Sb: 15 mol %
[Second Chalcogenide Glass Material] (IG4 Manufactured by VITRON Spezialwerkstoffe GmbH)
i) Physical Properties
Thermal properties:
glass transition point of 205° C., glass deformation point of 225° C., softening point of 245° C., thermal expansion coefficient of $204 \times 10^{-7}$/° C.
Optical properties: refractive index (n2) of 2.6084, Abbe number of 345
ii) Composition (Se—As—Ge)
Se: 50 mol %
As: 40 mol %
Ge: 10 mol %
[Diffraction Surface Data]
Design wavelength λ: 10 μm
Design order m: 1
Diffraction step height where an optical path length difference provided by adjacent orbicular zones at a design wavelength λ is 1λ: 0.507 mm
Diffraction step height where the optical path length difference is 0.6λ: 0.304 mm
Diffraction step height where the optical path length difference is 1.4λ: 0.710 mm However, since the optical path length difference and the diffraction step height are in proportion to each other, in the present example, as described above, the diffraction step height takes a value of 0.304 mm to 0.710 mm according to a value of 0.6λ to 1.4λ of the optical path length difference.

In FIG. 6, wavelength dependency of diffraction efficiency of the contacted multilayer diffractive optical element according to Example 4 is indicated by a solid line. In FIG. 6, the dotted line indicates wavelength dependency of diffraction efficiency of a single-layer diffractive optical element consisting of the first chalcogenide glass material. As indicated in FIG. 6, in the case of Example 4, also, it can be seen that as a result of the first chalcogenide glass material and the second chalcogenide glass material being brought into contact with and stacked on each other via a diffraction grating structure, wavelength dependency of diffraction efficiency was improved in a wider wavelength range.

Example 5

In Example 5, a contacted multilayer diffractive optical element according to the present invention was manufactured in such a manner that is similar to that of Example 1 except use of a first chalcogenide glass material and a second chalcogenide glass material having the physical properties and compositions below.
[First Chalcogenide Glass Material] (IRG25 Manufactured by SCHOTT AG)
i) Physical Properties
Thermal properties:
glass transition point of 275° C., glass deformation point of 285° C., softening point of 315° C., thermal expansion coefficient of $140 \times 10^{-7}$/° C.
Optical properties: refractive index (n1) of 2.6032, Abbe number of 220
ii) Composition (Se—Ge—Sb)
Se: 60 mol %
Ge: 28 mol %
Sb: 12 mol %
[Second Chalcogenide Glass Material] (Mixture Obtained by Mixing IRG23 Manufactured by SCHOTT AG and IRG24 Manufactured by SCHOTT AG at a Weight Ratio of 5:95)
i) Physical Properties
Thermal Properties:
glass transition point of 253° C., glass deformation point of 273° C., softening point of 283° C., thermal expansion coefficient of $208 \times 10^{-7}$/° C.
Optical properties: refractive index (n2): 2.6178, Abbe number of 350
ii) Composition (Se—As—Ge—Te)
Se: 49 mol %
As: 39 mol %
Ge: 11 mol %
Te: 1 mol %
[Diffraction Surface Data]
Design wavelength λ: 10 μm
Design order m: 1
Diffraction step height where an optical path length difference provided by adjacent orbicular zones at a design wavelength λ is 1λ: 0.686 mm
Diffraction step height where the optical path length difference is 0.6λ: 0.412 mm
Diffraction step height where the optical path length difference is 1.4λ: 0.960 mm However, since the optical path length difference and the diffraction step height are in proportion to each other, in the present example, as described above, the diffraction step height takes a value of 0.412 mm to 0.960 mm according to a value of 0.6λ to 1.4λ of the optical path length difference.

In FIG. 7, wavelength dependency of diffraction efficiency of the contacted multilayer diffractive optical element according to Example 5 is indicated by a solid line. In FIG. 7, the dotted line indicates wavelength dependency of diffraction efficiency of a single-layer diffractive optical element consisting of the first chalcogenide glass material. As indicated in FIG. 7, in the case of Example 5, also, it can be seen that as a result of the first chalcogenide glass material and the second chalcogenide glass material being brought into contact with and stacked on each other via a diffraction grating structure, wavelength dependency of diffraction efficiency was improved in a wider wavelength range.

Example 6

In Example 6, a contacted multilayer diffractive optical element according to the present invention was manufactured in such a manner that is similar to that of Example 1 except use of a first chalcogenide glass material and a second chalcogenide glass material having the physical properties and compositions below.

[First Chalcogenide Glass Material] (SIG2 Manufactured by Sunny Japan Co., Ltd.)
i) Physical Properties
Thermal properties:
glass transition point of 262° C., glass deformation point of 283° C., softening point of 304° C., thermal expansion coefficient of $161 \times 10^{-7}$/° C.
Optical properties: refractive index (n1) of 2.586, Abbe number of 209
ii) Composition (Se—Ge—Sb)
Se: 65 mol %
Ge: 20 mol %
Sb: 15 mol %
[Second Chalcogenide Glass Material] (IRG24 Manufactured by SCHOTT AG)
i) Physical Properties
Thermal properties:
glass transition point of 205° C., glass deformation point of 225° C., softening point of 245° C., thermal expansion coefficient of $204 \times 10^{-7}$/° C.
Optical properties: refractive index (n2) of 2.609, Abbe number of 358
ii) Composition (Se—As—Ge)
Se: 50 mol %
As: 40 mol %
Ge: 10 mol %
[Diffraction Surface Data]
Design wavelength λ: 10 μm
Design order m: 1
Diffraction step height where an optical path length difference provided by adjacent orbicular zones at a design wavelength λ is 1λ: 0.432 mm
Diffraction step height where the optical path length difference is 0.6λ: 0.259 mm
Diffraction step height where the optical path length difference is 1.4λ: 0.605 mm However, since the optical path length difference and the diffraction step height are in proportion to each other, in the present example, as described above, the diffraction step height takes a value of 0.259 mm to 0.605 mm according to a value of 0.6λ to 1.4λ of the optical path length difference.

In FIG. 8, wavelength dependency of diffraction efficiency of the contacted multilayer diffractive optical element according to Example 6 is indicated by a solid line. In FIG. 8, the dotted line indicates wavelength dependency of diffraction efficiency of a single-layer diffractive optical element consisting of the first chalcogenide glass material. As indicated in FIG. 8, in the case of Example 6, also, it can be seen that as a result of the first chalcogenide glass material and the second chalcogenide glass material being brought into contact with and stacked on each other via a diffraction grating structure, wavelength dependency of diffraction efficiency was improved in a wider wavelength range.

Example 7

In Example 7, a contacted multilayer diffractive optical element according to the present invention was manufactured in such a manner that is similar to that of Example 1 except use of a first chalcogenide glass material and a second chalcogenide glass material having the physical properties and compositions below.

[First Chalcogenide Glass Material] (IRG201 Manufactured by Hubei New Huaguang Information Materials Co., Ltd.)
i) Physical Properties
Thermal properties:
glass transition point of 362° C., glass deformation point of 385° C., softening point of 410° C., thermal expansion coefficient of $117 \times 10^{-7}$/° C.
Optical properties: refractive index (n1) of 2.498, Abbe number of 214
ii) Composition (Se—Ge—Sb)
Se: 55 mol %
Ge: 33 mol %
Sb: 12 mol %
[Second Chalcogenide Glass Material] (IRG24 Manufactured by SCHOTT AG)
i) Physical Properties
Thermal properties:
glass transition point of 205° C., glass deformation point of 225° C., softening point of 245° C., thermal expansion coefficient of $204 \times 10^{-7}$/° C.
Optical properties: refractive index (n2) of 2.609, Abbe number of 358
ii) Composition (Se—As—Ge)
Se: 50 mol %
As: 40 mol %
Ge: 10 mol %
[Diffraction Surface Data]
Design wavelength λ: 10 μm
Design order m: 1
Diffraction step height where an optical path length difference provided by adjacent orbicular zones at a design wavelength λ is 1λ: 0.090 mm
Diffraction step height where the optical path length difference is 0.6λ: 0.054 mm
Diffraction step height where the optical path length difference is 1.4λ: 0.126 mm However, since the optical path length difference and the diffraction step height are in proportion to each other, in the present example, as described above, the diffraction step height takes a value of 0.054 mm to 0.126 mm according to a value of 0.6λ to 1.4λ of the optical path length difference.

In FIG. 9, wavelength dependency of diffraction efficiency of the contacted multilayer diffractive optical element according to Example 7 is indicated by a solid line. In FIG. 9, the dotted line indicates wavelength dependency of diffraction efficiency of a single-layer diffractive optical element consisting of the first chalcogenide glass material. As indicated in FIG. 9, in the case of Example 7, also, it can be seen that as a result of the first chalcogenide glass material and the second chalcogenide glass material being brought into contact with and stacked on each other via a diffraction grating structure, wavelength dependency of diffraction efficiency was improved in a wider wavelength range albeit only slightly.

Example 8

In Example 8, a contacted multilayer diffractive optical element according to the present invention was manufactured in such a manner that is similar to that of Example 1 except use of a first chalcogenide glass material and a second chalcogenide glass material having the physical properties and compositions below.

[First Chalcogenide Glass Material] (IIR-SF2 Manufactured by Isuzu Glass Ltd.)
i) Physical Properties
Thermal properties:
glass transition point of 233° C., glass deformation point of 253° C., softening point of 278° C., thermal expansion coefficient of $156 \times 10^{-7}$/° C.
Optical properties: refractive index (n1) of 2.668, Abbe number of 65
ii) Composition (Ga—Sb—Sn—S)
Ga: 2 mol %
Sb: 30 mol %
Sn: 3 mol %
S: 65 mol %
[Second Chalcogenide Glass Material] (IRG204 Manufactured by Hubei New Huaguang Information Materials Co., Ltd.)
i) Physical Properties
Thermal properties:
glass transition point of 167° C., glass deformation point of 207° C., softening point of 247° C., thermal expansion coefficient of $205 \times 10^{-7}$/° C.
Optical properties: refractive index (n2): 2.765, Abbe number of 316
ii) Composition (Se—As—Sb—Sn)
Se: 63 mol %
As: 30 mol %
Sb: 4 mol %
Sn: 3 mol %
[Diffraction Surface Data]
Design wavelength λ: 10 μm
Design order m: 1
Diffraction step height where an optical path length difference provided by adjacent orbicular zones at a design wavelength λ is 1λ: 0.100 mm
Diffraction step height where the optical path length difference is 0.6λ: 0.060 mm
Diffraction step height where the optical path length difference is 1.4λ: 0.140 mm However, since the optical path length difference and the diffraction step height are in proportion to each other, in the present example, as described above, the diffraction step height takes a value of 0.060 mm to 0.140 mm according to a value of 0.6λ to 1.4λ of the optical path length difference.

In FIG. 10, wavelength dependency of diffraction efficiency of the contacted multilayer diffractive optical element according to Example 8 is indicated by a solid line. In FIG. 10, the dotted line indicates wavelength dependency of diffraction efficiency of a single-layer diffractive optical element consisting of the first chalcogenide glass material. As indicated in FIG. 10, in the case of Example 8, also, it can be seen that as a result of the first chalcogenide glass material and the second chalcogenide glass material being brought into contact with and stacked on each other via a diffraction grating structure, wavelength dependency of diffraction efficiency was improved in a wider wavelength range.

Example 9

In Example 9, a contacted multilayer diffractive optical element according to the present invention was manufactured using a first chalcogenide glass material (IIR-SF2 manufactured by Isuzu Glass Ltd.) that is the same as that in Example 8 in such a manner that is similar to that of Example 1 except use of a second chalcogenide glass material having the below physical properties and composition.

[Second Chalcogenide Glass Material] (IG3 Manufactured by VITRON Spezialwerkstoffe GmbH)
i) Physical Properties
Thermal properties:
glass transition point of 275° C., glass deformation point of 345° C., softening point of 415° C., thermal expansion coefficient of $134 \times 10^{-7}$/° C.
Optical properties: refractive index (n2) of 2.787, Abbe number of 325
ii) Composition (Ge—As—Se—Te)
Ge: 33 mol %
As: 13 mol %
Se: 52 mol %
Te: 25 mol %
[Diffraction surface data]
Design wavelength λ: 10 μm
Design order m: 1
Diffraction step height where an optical path length difference provided by adjacent orbicular zones at a design wavelength λ is 1λ: 0.084 mm
Diffraction step height where the optical path length difference is 0.6λ: 0.050 mm
Diffraction step height where the optical path length difference is 1.4λ: 0.118 mm However, since the optical path length difference and the diffraction step height are in proportion to each other, in the present example, as described above, the diffraction step height takes a value of 0.050 mm to 0.118 mm according to a value of 0.6λ to 1.4λ of the optical path length difference.

In FIG. 11, wavelength dependency of diffraction efficiency of the contacted multilayer diffractive optical element according to Example 9 is indicated by a solid line. In FIG. 11, the dotted line indicates wavelength dependency of diffraction efficiency of a single-layer diffractive optical element consisting of the first chalcogenide glass material. As indicated in FIG. 11, in the case of Example 9, also, it can be seen that as a result of the first chalcogenide glass material and the second chalcogenide glass material being brought into contact with and stacked on each other via a diffraction grating structure, wavelength dependency of diffraction efficiency was improved in a wider wavelength range.

Example 10

In Example 10, a contacted multilayer diffractive optical element according to the present invention was manufactured in such a manner that is similar to that of Example 1 except use of a first chalcogenide glass material (IIR-SF2 manufactured by Isuzu Glass Ltd.) that is the same as that in Example 8 and a second chalcogenide glass material (IRG23 manufactured by SCHOTT AG) that is the same as that in Example 2.

[Second Chalcogenide Glass Material] (IRG23 Manufactured by SCHOTT AG)
i) Physical Properties
Thermal properties:
glass transition point of 275° C., glass deformation point of 295° C., softening point of 305° C., thermal expansion coefficient of $134 \times 10^{-7}$/° C.

Optical properties: refractive index (n2) of 2.7869, Abbe number of 337 ii) Composition (Ge—As—Se—Te)
Ge: 30 mol %
As: 13 mol %
Se: 32 mol %
Te: 25 mol %

[Diffraction Surface Data]
Design wavelength λ: 10 μm
Design order m: 1
Diffraction step height where an optical path length difference provided by adjacent orbicular zones at a design wavelength λ is 1λ: 0.084 mm
Diffraction step height where the optical path length difference is 0.6λ: 0.050 mm
Diffraction step height where the optical path length difference is 1.4λ: 0.118 mm However, since the optical path length difference and the diffraction step height are in proportion to each other, in the present example, as described above, the diffraction step height takes a value of 0.050 mm to 0.118 mm according to a value of 0.6λ to 1.4λ of the optical path length difference.

In FIG. 12, wavelength dependency of diffraction efficiency of the contacted multilayer diffractive optical element according to Example 10 is indicated by a solid line. In FIG. 12, the dotted line indicates wavelength dependency of diffraction efficiency of a single-layer diffractive optical element consisting of the first chalcogenide glass material. As indicated in FIG. 12, in the case of Example 10, also, it can be seen that as a result of the first chalcogenide glass material and the second chalcogenide glass material being brought into contact with and stacked on each other via a diffraction grating structure, wavelength dependency of diffraction efficiency was improved in a wider wavelength range.

Also, in the present example, the first chalcogenide glass material that is different from that in Example 2 is used, but the second chalcogenide glass material that is the same as that in Example 2 is used. While in the contacted multilayer diffractive optical element in Example 2, the diffraction step height where the optical path length difference provided by the adjacent orbicular zones at a design wavelength λ is 1λ is 0.167 mm, in the contacted multilayer diffractive optical element in Example 10, as described above, the diffraction step height is 0.084 mm. In comparison with the first chalcogenide glass material (IIR-SF1) used in Example 2, the first chalcogenide glass material (IIR-SF2) used in Example 10 has high diffraction efficiency for first-order diffracted light in a wide range in a wavelength region of no less than 1 μm and no more than 18 μm. Thus, in comparison with the contacted multilayer diffractive optical element while diffraction efficiency that is equivalent to that in Example 2 is maintained, in the contacted multilayer diffractive optical element in Example 10, a step amount of diffraction steps was reduced. In other words, it has been confirmed that a proper combination of the first chalcogenide glass material and the second chalcogenide glass material enables reduction in step amount of diffraction steps and thus enables facilitation of machining and molding in forming diffraction steps.

Example 11

In Example 11, a contacted multilayer diffractive optical element according to the present invention was manufactured in such a manner that is similar to that of Example 1 except use of a first chalcogenide glass material (IIR-SF2 manufactured by Isuzu Glass Ltd.) that is the same as that in Example 8 and a second chalcogenide glass material (C-1 manufactured by Amorphous Materials Inc.) that is the same as that in Example 1.

[Second Chalcogenide Glass Material] (C-1 Manufactured by Amorphous Materials Inc.)

i) Physical Properties
Thermal properties: glass transition point of 167° C., glass deformation point of 188° C., softening point of 209° C., thermal expansion coefficient of $230 \times 10^{-7}$/° C.
Optical properties: refractive index (n2) of 2.8051, Abbe number of 384 ii) Composition (As—Se—Te)
As: 40 mol %
Se: 40 mol %
Te: 20 mol %

[Diffraction Surface Data]
Design wavelength λ: 10 μm
Design order m: 1
Diffraction step height where an optical path length difference provided by adjacent orbicular zones at a design wavelength λ is 1λ: 0.073 mm
Diffraction step height where the optical path length difference is 0.6λ: 0.044 mm
Diffraction step height where the optical path length difference is 1.4λ: 0.102 mm However, since the optical path length difference and the diffraction step height are in proportion to each other, in the present example, as described above, the diffraction step height takes a value of 0.044 mm to 0.102 mm according to a value of 0.6λ to 1.4λ of the optical path length difference.

In FIG. 13, wavelength dependency of diffraction efficiency of the contacted multilayer diffractive optical element according to Example 11 is indicated by a solid line. In FIG. 13, the dotted line indicates wavelength dependency of diffraction efficiency of a single-layer diffractive optical element consisting of the first chalcogenide glass material. As indicated in FIG. 13, in the case of Example 11, also, it can be seen that as a result of the first chalcogenide glass material and the second chalcogenide glass material being brought into contact with and stacked on each other via a diffraction grating structure, wavelength dependency of diffraction efficiency was improved in a wider wavelength range.

In each of Examples 1 to 11 above, a contacted multilayer diffractive optical element in which contact between the first layer consisting of the first chalcogenide glass material and the second layer consisting of the second chalcogenide glass material is favorable was obtained by the method illustrated in FIG. 2. Also, the diffraction grating structure was formed in the surface of the contact by means of molding and thus, processing in manufacture was easy.

Also, in the present example, the first chalcogenide glass material that is different from that in Example 1 is used, but the second chalcogenide glass material that is the same as that in Example 1 is used. While in the contacted multilayer diffractive optical element in Example 1, the diffraction step height where the optical path length difference provided by the adjacent orbicular zones at the design wavelength λ is 1λ is 0.125 mm, in the contacted multilayer diffractive optical element in Example 11, as described above, the diffraction step height is 0.073 mm. As in the case of Example 10, in comparison with the contacted multilayer diffractive optical element in Example 1 while diffraction efficiency that is equivalent to that in Example 1 is maintained, a step amount of diffraction steps was reduced in the contacted multilayer diffractive optical element in Example 11.

The compositions, the refractive indexes (n1), the Abbe numbers (ν1), the glass transition points, the glass deformation point, softening points, the thermal expansion coefficients of the first chalcogenide glass materials used in Examples 1 to 11 are arranged in Table 1. Also, the compositions, the refractive indexes (n2), the Abbe numbers (ν2), the glass transition points, the glass deformation points, the softening points and the thermal expansion coefficients of the second chalcogenide glass materials used in Examples 1 to 11 are arranged in Table 2. The refractive index differences Δn between the first chalcogenide glass materials and the second chalcogenide glass materials, the blaze wavelengths, the step heights where the optical path length difference provided by adjacent orbicular zones at the blaze wavelength is 1λ, the glass transition point differences, the glass deformation point differences, the softening point differences, the thermal expansion coefficients are arranged in Table 3.

TABLE 1

| | | | n1 | | | | | |
|---|---|---|---|---|---|---|---|---|
| | Material type | Composition | n1 | ν1 | Glass transition point (° C.) | Glass deformation point (° C.) | Softening point (° C.) | Thermal expansion coefficient ($10^{-7}$/° C.) |
| Example 1 | IIR-SF1 | Ge: 2 mol % | 2.724 | 64 | 233 | 253 | 278 | 156 |
| Example 2 | | Sb: 30 mol % | | | | | | |
| Example 3 | | Sn: 3 mol % | | | | | | |
| | | S: 65 mol % | | | | | | |
| Example 4 | IRG203 | Se: 65 mol % | 2.589 | 125 | 266 | 285 | 304 | 157 |
| | | Ge: 20 mol % | | | | | | |
| | | Sb: 15 mol % | | | | | | |
| Example 5 | IRG25 | Se: 60 mol % | 2.603 | 220 | 275 | 285 | 315 | 140 |
| | | Ge: 28 mol % | | | | | | |
| | | Sb: 12 mol % | | | | | | |
| Example 6 | SIG2 | Se: 65 mol % | 2.586 | 209 | 262 | 283 | 304 | 161 |
| | | Ge: 20 mol % | | | | | | |
| | | Sb: 15 mol % | | | | | | |
| Example 7 | IRG201 | Se: 55 mol % | 2.498 | 214 | 362 | 385 | 410 | 117 |
| | | Ge: 33 mol % | | | | | | |
| | | Sb: 12 mol % | | | | | | |
| Example 8 | IIR-SF2 | Ga: 2 mol % | 2.668 | 65 | 233 | 253 | 278 | 156 |
| Example 9 | | Sb: 30 mol % | | | | | | |
| Example 10 | | Sn: 3 mol % | | | | | | |
| Example 11 | | S: 65 mol % | | | | | | |

TABLE 2

| | | | n2 | | | | | |
|---|---|---|---|---|---|---|---|---|
| | Material type | Composition | n2 | ν2 | Glass transition point (° C.) | Glass deformation point (° C.) | Softening point (° C.) | Thermal expansion coefficient ($10^{-7}$/° C.) |
| Example 1 | C-1 | As: 40 mol % | 2.805 | 384 | 167 | 188 | 209 | 230 |
| | | Se: 40 mol % | | | | | | |
| | | Te: 20 mol % | | | | | | |
| Example 2 | IRG23 | Ge: 30 mol % | 2.787 | 337 | 275 | 295 | 305 | 134 |
| | | As: 13 mol % | | | | | | |
| | | Se: 32 mol % | | | | | | |
| | | Te: 25 mol % | | | | | | |
| Example 3 | IG6 | Se: 60 mol % | 2.778 | 317 | 180 | 185 | 217 | 207 |
| | | As: 40 mol % | | | | | | |
| Example 4 | IG4 | Se: 50 mol % | 2.608 | 345 | 205 | 225 | 245 | 204 |
| | | As: 40 mol % | | | | | | |
| | | Ge: 10 mol % | | | | | | |
| Example 5 | IRG23/ IRG24 = 5/95 | Se: 49 mol % | 2.618 | 350 | 253 | 273 | 283 | 208 |
| | | As: 39 mol % | | | | | | |
| | | Ge: 11 mol % | | | | | | |
| | | Te: 1 mol % | | | | | | |
| Example 6 | IRG24 | Se: 50 mol % | 2.609 | 358 | 205 | 225 | 245 | 204 |
| | | As: 40 mol % | | | | | | |
| | | Ge: 10 mol % | | | | | | |
| Example 7 | IRG24 | | 2.609 | 358 | 205 | 225 | 245 | 204 |
| Example 8 | IRG204 | Se: 63 mol % | 2.765 | 316 | 167 | 207 | 247 | 205 |
| | | As: 30 mol % | | | | | | |
| | | Sb: 4 mol % | | | | | | |
| | | Sn: 3 mol % | | | | | | |
| Example 9 | IG3 | Ge: 33 mol % | 2.787 | 325 | 275 | 345 | 415 | 134 |
| | | As: 13 mol % | | | | | | |
| | | Se: 52 mol % | | | | | | |
| | | Te: 25 mol % | | | | | | |

TABLE 2-continued

| | Material type | Composition | n2 | ν2 | Glass transition point (° C.) | Glass deformation point (° C.) | Softening point (° C.) | Thermal expansion coefficient ($10^{-7}$/° C.) |
|---|---|---|---|---|---|---|---|---|
| Example 10 | IRG23 | Ge: 30 mol %<br>As: 13 mol %<br>Se: 32 mol %<br>Te: 25 mol % | 2.787 | 337 | 275 | 295 | 305 | 134 |
| Example 11 | C-1 | As: 40 mol %<br>Se: 40 mol %<br>Te: 20 mol % | 2.805 | 384 | 167 | 188 | 209 | 230 |

TABLE 3

| | Δn | Blaze wavelength (μm) | Step height (mm) | Glass transition point difference (° C.) | Glass deformation point difference (° C.) | Softening point difference (° C.) | Thermal expansion coefficient ($10^{-7}$/° C.) |
|---|---|---|---|---|---|---|---|
| Example 1 | 0.081 | 10 | 0.125 | 66 | 65 | 69 | 74 |
| Example 2 | 0.063 | 10 | 0.160 | 42 | 42 | 27 | 22 |
| Example 3 | 0.054 | 10 | 0.188 | 53 | 68 | 61 | 51 |
| Example 4 | 0.020 | 10 | 0.507 | 61 | 60 | 59 | 47 |
| Example 5 | 0.015 | 10 | 0.686 | 22 | 12 | 32 | 68 |
| Example 6 | 0.023 | 10 | 0.432 | 57 | 58 | 59 | 43 |
| Example 7 | 0.111 | 10 | 0.090 | 157 | 160 | 165 | 87 |
| Example 8 | 0.097 | 10 | 0.100 | 66 | 46 | 31 | 49 |
| Example 9 | 0.119 | 10 | 0.084 | 42 | 92 | 137 | 22 |
| Example 10 | 0.119 | 10 | 0.084 | 42 | 42 | 27 | 22 |
| Example 11 | 0.137 | 10 | 0.073 | 66 | 65 | 69 | 74 |

INDUSTRIAL APPLICABILITY

The present invention enables provision of a contacted multilayer diffractive optical element having reduced wavelength dependency of diffraction efficiency, the contacted multilayer diffractive optical element facilitating processing in manufacture and being favorable for an infrared optical system, and an infrared optical system and an image pickup apparatus using the diffractive optical element.

REFERENCE SIGNS LIST

10 . . . First layer
20 . . . Second layer
30 . . . Diffraction grating structure
100 . . . Contacted multilayer diffractive optical element
θ . . . Inclination angle
H . . . Blaze height
W . . . Pitch

The invention claimed is:

1. A contacted multilayer diffractive optical element comprising a first layer consisting of a first chalcogenide glass material and a second layer consisting of a second chalcogenide glass material, the first chalcogenide glass material and the second chalcogenide glass material satisfying Expression (1) below and Expression (2) below, the first layer and the second layer being in contact with and stacked on each other, and a diffraction grating structure prescribed by Expression (i) below in a surface of the contact therebetween, $$n1 < n2 \quad (1),$$

$$\nu1 < \nu2 \quad (2), \text{ and}$$

where
n1 is a refractive index of the first chalcogenide glass material for a light ray having a wavelength $\lambda_1$,
n2 is a refractive index of the second chalcogenide glass material for the light ray having the wavelength $\lambda_1$,
ν1 is an Abbe number of the first chalcogenide glass material for the light ray having the wavelength $\lambda_1$,
ν2 is an Abbe number of the second chalcogenide glass material for the light ray having the wavelength $\lambda_1$,
Φ(r) is a phase difference function,
r is a length from an optical axis in a radial direction,
each of $\varphi_2$, $\varphi_4$, $\varphi_6$ . . . is an arbitrary coefficient,
m is a diffraction order,
$\lambda_1$ is an arbitrary wavelength of no less than 1 μm and no more than 18 μm, and
λ is a design wavelength and is an arbitrary wavelength of no less than 1 μm and no more than 18 μm,
wherein a composition of the first chalcogenide glass material is a mixture comprising at least S and Sn,
wherein a composition of the second chalcogenide glass material is a mixture comprising at least As and Se,
wherein the composition of the first chalcogenide glass material is
no less than 2 mol % and no more than 25 mol % of any one or more of Ge and Ga,
no less than 6 mol % and no more than 38 mol % of any one or more of Sb and Bi,
no less than 1 mol % and no more than 25 mol % of any one or more of Sn and an alloy of Sn and Zn, and
no less than 58 mol % and no more than 80 mol % of any one or more of S, a mixture of S and Se, a mixture of S and Te, and a mixture of S, Se, and Te; and
the composition of the second chalcogenide glass material is no less than 22 mol % and no more than 73 mol % of Se, and no less than 3 mol % and no more than 50 mol % of As.

2. The contacted multilayer diffractive optical element according to claim 1, wherein a glass transition point temperature difference between the first chalcogenide glass material and the second chalcogenide glass material is no less than 10° C.

3. The contacted multilayer diffractive optical element according to claim 1, wherein a glass deformation point temperature difference between the first chalcogenide glass material and the second chalcogenide glass material is no less than 10° C.

4. The contacted multilayer diffractive optical element according to claim 1, wherein a thermal expansion coefficient difference between the first chalcogenide glass material and the second chalcogenide glass material is within $100 \times 10^{-7}$/° C.

5. The contacted multilayer diffractive optical element according to claim 1, wherein a diffraction step height is no less than 0.01 mm and no more than 1.50 mm.

6. The contacted multilayer diffractive optical element according to claim 1, wherein the first chalcogenide glass material and the second chalcogenide glass material are contacted with and stacked on each other by molding.

7. The contacted multilayer diffractive optical element according to claim 1, wherein each of the first chalcogenide glass material and the second chalcogenide glass material is a chalcogenide glass material satisfying Expression (3) below:

$$-0.025\alpha+2.6<\alpha(n-1)/\nu+n<-0.028\alpha+2.9 \qquad (3),$$

where n is a refractive index of the chalcogenide glass material for the light ray of the wavelength $\lambda_T$, $2.50<n<3.00$, ν is an Abbe number of the chalcogenide glass material for the light ray of the wavelength $\lambda_T$, $20<\nu<600$, and α is an arbitrary numerical value satisfying $-1.5>\alpha>-5.0$.

8. The contacted multilayer diffractive optical element according to claim 1, wherein each of the first chalcogenide glass material and the second chalcogenide glass material is a chalcogenide glass material satisfying Expression (4) below:

$$-0.024\alpha+2.4<\alpha(n-1)/\nu+n<-0.025\alpha+2.7 \qquad (4),$$

where n is a refractive index of the chalcogenide glass material for the light ray of the wavelength $\lambda_T$, $2.50<n<2.80$, ν is an Abbe number of the chalcogenide glass material for the light ray of the wavelength $\lambda_T$, $50<\nu<600$, and α is an arbitrary numerical value satisfying $-1.5>\alpha>-5.0$.

9. The contacted multilayer diffractive optical element according to claim 1, wherein each of the first chalcogenide glass material and the second chalcogenide glass material is a chalcogenide glass material satisfying Expression (5) below:

$$-0.036\alpha+2.3<\alpha(n-1)/\nu+n<-0.039\alpha+2.5 \qquad (5),$$

where n is a refractive index of the chalcogenide glass material for the light ray of the wavelength $\lambda_T$, $2.40<n<2.60$, is an Abbe number of the chalcogenide glass material for the light ray of the wavelength $\lambda_T$, $50<\nu<600$, and α is an arbitrary numerical value satisfying $-1.5>\alpha>-5.0$.

10. The contacted multilayer diffractive optical element according to claim 1, wherein each of the first chalcogenide glass material and the second chalcogenide glass material is a chalcogenide glass material satisfying Expression (6) below:

$$-0.035\alpha+2.3<\alpha(n-1)/\nu+n<-0.028\alpha+2.9 \qquad (6),$$

where n is a refractive index of the chalcogenide glass material for the light ray of the wavelength $\lambda_T$, $2.40<n<3.00$, ν is an Abbe number of the chalcogenide glass material for the light ray of the wavelength $\lambda_T$, $20<\nu<600$, and α is an arbitrary numerical number satisfying $-1.5>\alpha>-5.0$.

11. The contacted multilayer diffractive optical element according to claim 1, wherein the second chalcogenide glass material contains no more than 20 mol % of at least one Ge, Te, Sb, and Sn.

12. An infrared optical system comprising the contacted multilayer diffractive optical element according to claim 1.

13. An image pickup apparatus comprising an infrared optical system including the contacted multilayer diffractive optical element according to claim 1.

14. The contacted multilayer diffractive optical element according to claim 2, wherein a glass deformation point temperature difference between the first chalcogenide glass material and the second chalcogenide glass material is no less than 10° C.

15. The contacted multilayer diffractive optical element according to claim 2, wherein a thermal expansion coefficient difference between the first chalcogenide glass material and the second chalcogenide glass material is within $100 \times 10^{-7}$/° C.

16. The contacted multilayer diffractive optical element according to claim 2, wherein a diffraction step height is no less than 0.01 mm and no more than 1.50 mm.

17. The contacted multilayer diffractive optical element according to claim 3, wherein a thermal expansion coefficient difference between the first chalcogenide glass material and the second chalcogenide glass material is within $100 \times 10^{-7}$/° C.

* * * * *

UNITED STATES PATENT AND TRADEMARK OFFICE
CERTIFICATE OF CORRECTION

PATENT NO. : 10,845,515 B2
APPLICATION NO. : 15/579726
DATED : November 24, 2020
INVENTOR(S) : Kazunori Komori It is certified that error appears in the above-identified patent and that said Letters Patent is hereby corrected as shown below:

In the Claims

Column 28, Line 33, Claim 1, above "where" insert -- $\Phi(r)=(\varphi_2 r^2+\varphi_4 r^4+\varphi_6 r^6+ \ldots )\times m/\lambda$ (i), --

Column 28, Line 36, Claim 1, delete "$\lambda_1$," and insert -- $\lambda_I$, --

Column 28, Line 38, Claim 1, delete "$\lambda_1$," and insert -- $\lambda_I$, --

Column 28, Line 40, Claim 1, delete "$\lambda_1$," and insert -- $\lambda_I$, --

Column 28, Line 42, Claim 1, delete "$\lambda_1$," and insert -- $\lambda_I$, --

Column 28, Line 47, Claim 1, delete "$\lambda$"

Column 29, Line 35, Claim 7, delete "$\lambda_1$," and insert -- $\lambda_I$, --

Column 30, Line 10, Claim 9, before "is" insert -- ν --

Column 30, Line 31, Claim 11, after "one" insert -- of --

Column 30, Line 32, Claim 11, delete "Sb," and insert -- Sb --

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*